US012219527B2

United States Patent
Masini et al.

(10) Patent No.: US 12,219,527 B2
(45) Date of Patent: Feb. 4, 2025

(54) METHODS PROVIDING RESOURCE COORDINATION INFORMATION BETWEEN RAN NODES FOR SIDELINK COMMUNICATIONS AND RELATED NETWORK NODES

(71) Applicant: Telefonaktiebolaget LM Ericsson (publ), Stockholm (SE)

(72) Inventors: Gino Masini, Stockholm (SE); Marco Belleschi, Solna (SE); Filip Barac, Huddinge (SE); Mohammed Yazid Lyazidi, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 567 days.

(21) Appl. No.: 17/427,384

(22) PCT Filed: Jan. 14, 2020

(86) PCT No.: PCT/EP2020/050811
§ 371 (c)(1),
(2) Date: Jul. 30, 2021

(87) PCT Pub. No.: WO2020/164836
PCT Pub. Date: Aug. 20, 2020

(65) Prior Publication Data
US 2022/0104179 A1 Mar. 31, 2022

Related U.S. Application Data

(60) Provisional application No. 62/804,054, filed on Feb. 11, 2019.

(51) Int. Cl.
H04W 72/02 (2009.01)
H04L 1/1607 (2023.01)
(Continued)

(52) U.S. Cl.
CPC .......... *H04W 72/02* (2013.01); *H04L 1/1614* (2013.01); *H04W 4/40* (2018.02);
(Continued)

(58) Field of Classification Search
CPC ...... H04L 1/1614; H04W 72/02; H04W 4/40; H04W 72/0446; H04W 72/0453;
(Continued)

(56) References Cited

U.S. PATENT DOCUMENTS

2014/0087721 A1   3/2014   Dimou
2016/0088127 A1   3/2016   Cai
(Continued)

FOREIGN PATENT DOCUMENTS

CN   106535332 A   3/2017

OTHER PUBLICATIONS

Selinis et al. "The Race to 5G Era; LTE and Wi-Fi", IEEE 2018 (Year: 2018).*
(Continued)

*Primary Examiner* — Omer S Mian
(74) *Attorney, Agent, or Firm* — Sage Patent Group

(57) ABSTRACT

Methods may be provided to operate radio access network RAN nodes in a wireless communication network. For example, resource coordination information may be transmitted from a first RAN node to a second RAN node, wherein the resource coordination information defines at least one communication resource that is available for a wireless terminal to use for sidelink communication. According to some other embodiments, resource coordination information may be received at a first RAN node from a second RAN node, wherein the resource coordination information defines at least one communication resource that is available for a wireless terminal to use for sidelink
(Continued)

communication. Related RAN nodes, computer programs, and computer program products are also discussed.

13 Claims, 21 Drawing Sheets

(51) Int. Cl.
| | | |
|---|---|---|
| *H04W 4/40* | (2018.01) | |
| *H04W 72/0446* | (2023.01) | |
| *H04W 72/0453* | (2023.01) | |
| *H04W 72/542* | (2023.01) | |
| *H04W 76/15* | (2018.01) | |

(52) U.S. Cl.
CPC ... *H04W 72/0446* (2013.01); *H04W 72/0453* (2013.01); *H04W 72/542* (2023.01); *H04W 76/15* (2018.02)

(58) Field of Classification Search
CPC ... H04W 72/542; H04W 76/15; H04W 72/27; H04W 72/1215; H04W 76/14
See application file for complete search history.

(56) References Cited

U.S. PATENT DOCUMENTS

| | | | |
|---|---|---|---|
| 2016/0227459 A1* | 8/2016 | Fujishiro | H04W 36/0069 |
| 2018/0160342 A1 | 6/2018 | Park et al. | |
| 2018/0184475 A1 | 6/2018 | Babaei et al. | |
| 2018/0368191 A1 | 12/2018 | Vutukuri et al. | |
| 2019/0174311 A1* | 6/2019 | Hayashi | H04L 9/0866 |
| 2020/0136771 A1* | 4/2020 | Xu | H04L 5/0032 |
| 2020/0154494 A1* | 5/2020 | Lee | H04W 76/14 |
| 2022/0322169 A1* | 10/2022 | Park | H04W 36/0033 |
| 2023/0217519 A1* | 7/2023 | Vutukuri | H04W 4/70 |
| | | | 455/509 |

OTHER PUBLICATIONS

Zhou et al., "Local End-to-End Paths for Low Latency Vehicular Communication" IEEE 2018 (Year: 2018).*
Search Report for Chinese Patent Application No. 2020800138316 mailed Oct. 27, 2023, 3 pages.
International Search Report and Written Opinion of the International Searching Authority for PCT International Application No. PCT/EP2020/050811 dated Mar. 19, 2020.
LG Electronics Inc., "Considerations on the issues for MR-DC based NR V2X," R3-186587, 3GPP TSG-RAN WG3 Meeting #102, Spokane, USA, Nov. 12-16, 2018, 2 pages.
LG Electronics Inc., "Cross-RAT sidelink configuration in MR-DC," R2-1818424, 3GPP TSG-RAN WG2 Meeting #104, Spokane, USA, Nov. 12-16, 2018, 2 pages.
3GPP TS 38.423 V15.1.0, "3rd Generation Partnership Project; Technical Specification Group Radio Access Network; NG-RAN; Xn application protocol (XnAP) (Release 15)," Technical Specification, Sep. 2018, 263 pages.
Ericsson, "Resource coordination in MR-DC for Nr V2X sidelink communication," R3-195937, 3GPP TSG-RAN3 Meeting #105bis, Chongqing, China, Oct. 14-18, 2019, 6 pages.
3GPP TS 36.423 V15.4.0, "3rd Generation Partnership Project; Technical Specification Group Radio Access Network; Evolved Universal Terrestrial Radio Access Network (E-Utran); X2 application protocol (X2AP) (Release 15)," Technical Specification, Dec. 2018, 408 pages.
3GPP TS 38.473 V15.4.1,"3rd Generation Partnership Project; Technical Specification Group Radio Access Network; NG-RAN; F1 application protocol (F1AP) (Release 15)," Technical Specification, Jan. 2019, 192 pages.
3GPP TR 38.885 V1.0.0, "3rd Generation Partnership Project; Technical Specification Group Radio Access Network; NR; Study on Vehicle-to-Everything (Release 16)," Technical Report Nov. 2018, 23 pages.
Chinese Office Action and Search Report, Chinese Patent Application No. 202080013831.6, mailed Sep. 30, 2024.
CATT, "Discussion on SCG failure", R3-180803, 3GPP TSG-RAN WG3#99, Athens, Greece, Feb. 2-Mar. 2, 2018, 2 pages.

* cited by examiner

Figure 9

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| ... | ... | ... | ... | ... | ... | ... |
| NR UE Security Capabilities | M | | 9.2.107 | | YES | reject |
| ... | ... | ... | ... | ... | ... | ... |
| Subscriber Profile ID for RAT/Frequency priority | O | | 9.2.25 | | YES | ignore |
| MeNB Cell ID | M | | ECGI 9.2.14 | Indicates the cell ID for PCell in MeNB. | YES | reject |
| V2X Services Authorized | O | | 9.2.93 | | YES | ignore |
| V2X MeNB Resource Coordination Information | O | | MeNB Resource Coordination Information 9.2.116 | Information used to coordinate V2X resources utilisation between MeNB and en-gNB | YES | ignore |

| Range bound | Explanation |
|---|---|
| maxnoofBearers | Maximum no. of E-RABs. Value is 256. |

| Condition | Explanation |
|---|---|
| ifMCGandSCGpresent | This IE shall be present if, for the E-RAB requested to be added, the MCG resources and SCG resources IEs in the EN-DC Resource Configuration IE are set to the value "present". |
| ifMCGpresent | This IE shall be present if, for the E-RAB requested to be added, the MCG resources IE in the EN-DC Resource Configuration IE is set to the value "present". |
| C-ifMCGandSCGpresent_GBR | This IE shall be present if, for the E-RAB requested to be added, the MCG resources and SCG resources IEs in the EN-DC Resource Configuration IE are set to the value "present", and GBR QoS Information IE is present in Full E-RAB Level QoS Parameters IE. |

Figure 10

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | reject |
| *** | *** | *** | *** | *** | | |
| RRC config indication | O | | 9.2.132 | Indicates the type of RRC configuration used at the en-gNB. | YES | reject |
| V2X SgNB Resource Coordination Information | O | | SgNB Resource Coordination Information 9.2.117 | Information used to coordinate V2X resources utilisation between en-gNB and MeNB. | YES | ignore |

| Range bound | Explanation |
|---|---|
| maxnoofBearers | Maximum no. of E-RABs. Value is 256 |

| Condition | Explanation |
|---|---|
| ifMCGpresent | This IE shall be present if, for the E-RAB admitted to be added, the MCG resources IE in the EN-DC Resource Configuration IE is set to the value "present". |
| ifMCGandSCGpresent | This IE shall be present if, for the E-RAB admitted to be added, the MCG resources and SCG resources IEs in the EN-DC Resource Configuration IE are set to the value "present". |
| C-ifMCGandSCGpresent_GBRpresent | This IE shall be present if, for the E-RAB admitted to be added, the MCG resources and SCG resources IEs in the EN-DC Resource Configuration IE are set to the value "present", and the GBR QoS Information IE is present in the Requested MCG E-RAB Level QoS Parameters IE. |

Figure 11

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | reject |
| *** | *** | *** | *** | *** | | |
| Requested split SRBs release | O | | ENUMERAT ED (srb1, srb2, srb1&2, ...) | Indicates that resources for Split SRB are requested to be released. | YES | ignore |
| V2X Services Authorized | O | | 9.2.93 | | YES | ignore |
| V2X MeNB Resource Coordination Information | O | | MeNB Resource Coordination Information 9.2.116 | Information used to coordinate V2X resources utilisation between MeNB and en-gNB. | YES | ignore |
| *** | *** | *** | *** | *** | | |

| Range bound | Explanation |
|---|---|
| maxnoofBearers | Maximum no. of E-RABs. Value is 256 |

| Condition | Explanation |
|---|---|
| ifMCGandSCGpresent | This IE shall be present if, for the E-RAB requested to be added, the *MCG resources* and *SCG resources* IEs in the *EN-DC Resource Configuration* IE are set to the value "present". |
| *** | *** |

Figure 12

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | ignore |
| *** | *** | *** | *** | *** | | |
| RRC config indication | O | | 9.2.132 | Indicates the type of RRC configuration used at the en-gNB. | YES | reject |
| V2X SgNB Resource Coordination Information | O | | SgNB Resource Coordination Information 9.2.117 | Information used to coordinate V2X resources utilisation between en-gNB and MeNB | YES | ignore |

| Range bound | Explanation |
|---|---|
| maxnoofBearers | Maximum no. of E-RABs. Value is 256 |
| *** | *** |

| Condition | Explanation |
|---|---|
| *** | *** |

Figure 13

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | reject |
| *** | *** | *** | *** | *** | | |
| RRC config indication | O | | 9.2.132 | Indicates the type of RRC configuration used at the en-gNB. | YES | reject |
| V2X SgNB Resource Coordination Information | O | | SgNB Resource Coordination Information 9.2.117 | Information used to coordinate V2X resources utilisation between the en-gNB and the MeNB. | YES | ignore |
| *** | *** | *** | *** | *** | | |

| Range bound | Explanation |
|---|---|
| maxnoofBearers | Maximum no. of E-RABs. Value is 256 |
| *** | *** |

Figure 14

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB. | YES | ignore |
| *** | *** | *** | *** | *** | | |
| MeNB Resource Coordination Information | O | | 9.2.116 | Information used to coordinate resources utilisation between the MeNB and the en-gNB. | YES | ignore |
| V2X Services Authorized | O | | 9.2.93 | Information used to coordinate V2X resources utilisation between the MeNB and the en-gNB | YES | ignore |
| V2X MeNB Resource Coordination Information | O | | MeNB Resource Coordination Information 9.2.116 | | YES | ignore |

| Range bound | Explanation |
|---|---|
| maxnoofBearers | Maximum no. of E-RABs. Value is 256 |

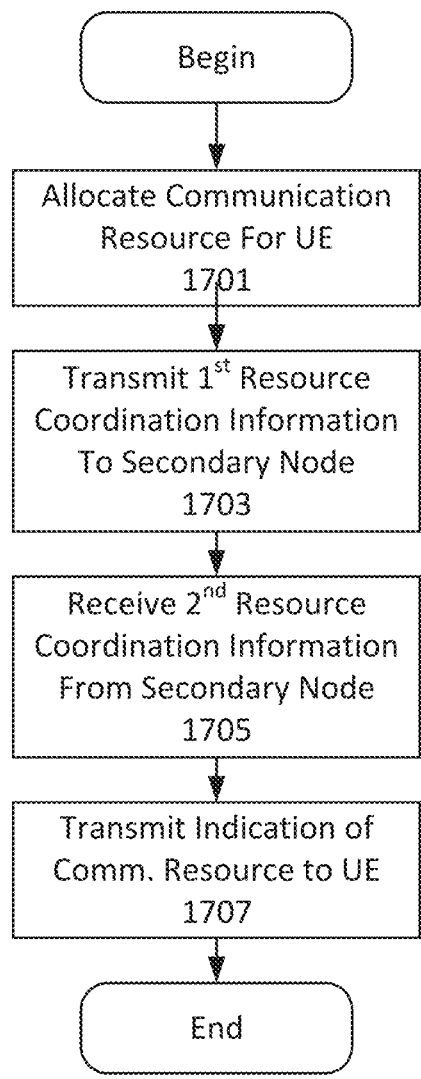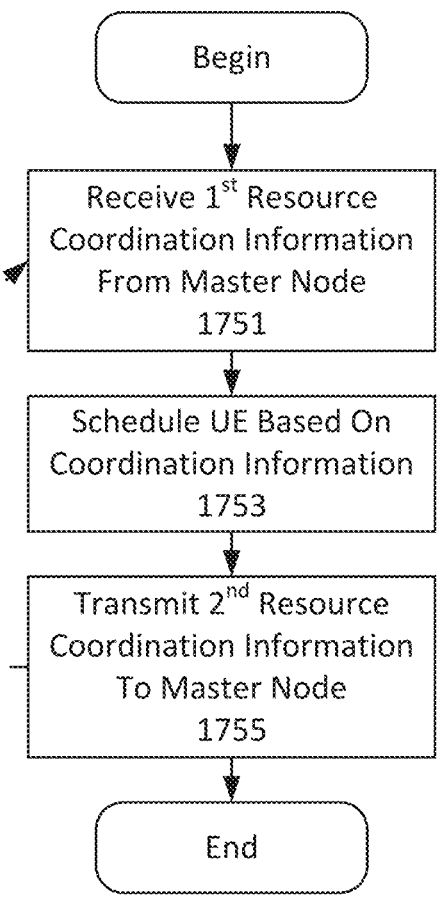
Figure 17A
Figure 17B

METHODS PROVIDING RESOURCE COORDINATION INFORMATION BETWEEN RAN NODES FOR SIDELINK COMMUNICATIONS AND RELATED NETWORK NODES

CROSS REFERENCE TO RELATED APPLICATIONS

This application is a 35 U.S.C. § 371 national stage application of PCT International Application No. PCT/EP2020/050811 filed on Jan. 14, 2020, which claims the benefit of U.S. Provisional Patent Application Ser. No. 62/804,054, filed on Feb. 11, 2019, the disclosures and content of which are incorporated by reference herein in their entireties.

TECHNICAL FIELD

The present disclosure relates generally to communications, and more particularly, to wireless communications and related wireless communication devices and network nodes.

BACKGROUND

In RAN #80, a new Study Item named "Study on NR V2X" was approved to study the enhancement to support advanced V2X (vehicle-to-anything or vehicular-to-anything) services beyond services supported in LTE (Long Term Evolution) Rel-15 V2X. One of the objectives for NR (New Radio) V2X design is to study technical solutions for QoS (Quality of Service) management of the radio interface including both Uu (i.e., network-to-vehicle UE communication) and sidelink (i.e., vehicle UE-to-vehicle UE communication) used for V2X operations.

The advanced V2X services, e.g., advanced driving, extended sensors, platooning, captured in 3GPP Technical Report 22.886 V16.2.0, may require enhanced NR system and new NR Sidelink SL to meet the stringent requirements. Both communication interfaces, PC5 and Uu, could be used to support advanced V2X use cases, taking into account radio conditions and the environment where the enhanced V2X (eV2X) scenario takes place. NR V2X systems may be expected to have a flexible design to support services with low latency and high reliability requirements, with higher system capacity and better coverage. The flexibility of the NR sidelink framework may allow easy extension of NR systems to support future development of further advanced V2X services and/or other services.

Support for V2V and V2X services has been introduced in LTE during Releases 14 and 15, in order to expand the 3GPP platform to the automotive industry use cases. These work items defined an LTE Sidelink (SL) suitable for vehicular applications, and complementary enhancements to the cellular infrastructure.

3GPP V2X phase 2 in Rel-15 introduces several new features in SL, including: carrier aggregation, high-order modulation, latency reduction, and feasibility study on both transmission diversity and short Transmission Time Interval TTI in SL. All these enhanced features in 3GPP V2X phase 2 may be primarily based on LTE and may require coexisting with Rel-14 UE (User equipment) in the same resource pool.

The study defines at least the following two SL resource allocation modes:

Mode 1: NG-RAN (Next Generation Radio Access Network) schedules SL resource(s) to be used by UE for SL transmission(s). Similar to LTE, this type of scheduling strategy may only be applicable to RRC_CONNECTED UEs. In particular, it is foreseen that similar to LTE SL operations, the gNB (Next Generation NodeB) may either perform dynamic SL resource allocation or semi-persistent resource allocation.

Mode 2: UE autonomously determines the SL transmission resource(s) to be used for SL operations. Similar to LTE, such selected SL transmission resources may be taken from one or more SL resource pools configured by the RAN/network or pre-configured in the UE. Unlike mode-1, this SL mode can be used both when the UE is in RRC_CONNECTED mode and when the UE is in INACTIVE/IDLE state, and also when the UE is under Uu coverage and out-of-coverage. In particular, when the UE is in RRC_CONNECTED mode, the SL resource pool can be configured with dedicated RRC (Radio Resource Control) signalling, while for IDLE/INACTIVE mode operations, the UE shall rely on the SL resource pool provisioned in broadcasting signal, i.e., SIB (System Information Block). Currently, as part of the NR-V2X Study Item, 3GPP is investigating possible extension of such mode-2. For example, 3GPP is considering the possibility to introduce a new UE functionality, in which a UE under certain conditions, e.g. for groupcast SL communication, is allowed to provision other UEs with a mode-2 pool to be used for SL communication, e.g. for SL communication within a group of UEs, such as a platoon of vehicles.

In Rel-14 V2X, the Mobility Management Entity (MME) indicates the UE authorization status to the eNB. When the UE requests resources from the eNB, the eNB checks the UE's authorization information according to the V2X service authorized Information Element IE in the UE context obtained from the MME. If the UE is authorized, the eNB configures the corresponding resource for the UE. Similarly, for NR V2X, the gNB can obtain V2X UE-related authorization information from the Authentication Management Function AMF and/or via Xn interface and verify whether the UE is authorized when the UE requests NR sidelink resources.

MR-DC (Multi-Radio Dual Connectivity) operation scenarios for V2X considered in the study are illustrated in FIGS. 1, 2, and 3 as discussed below:

1) In scenario 1 of FIG. 1, a UE's V2X communication in LTE SL and NR SL is controlled/configured by Uu while the UE is configured with EN-DC (E-UTRA-NR Dual Connectivity) (Option 3);
2) In scenario 2 of FIG. 2, a UE's V2X communication in LTE SL and NR SL is controlled/configured by Uu while the UE is configured in NGEN-DC (NG-RAN E-UTRA-NR Dual Connectivity) (Option 4);
3) In scenario 3 of FIG. 3, a UE's V2X communication in LTE SL and NR SL is controlled/configured by Uu while the UE is configured in NE-DC (NR-E-UTRA Dual Connectivity) (Option 7).

Notwithstanding SL/V2X communications discussed above, there continues to exist demand for improved sidelink communications (e.g., between vehicles).

SUMMARY

According to some embodiments, methods may be provided to operate a first radio access network RAN node in a wireless communication network. In such methods, resource coordination information may be transmitted from the first RAN node to a second RAN node, wherein the resource coordination information defines at least one communication resource that is available for a wireless terminal to use for sidelink communication.

According to some other embodiments, methods may be provided to operate a first radio access network RAN node in a wireless communication network. In such methods, resource coordination information may be received at the first RAN node from a second RAN node, wherein the resource coordination information defines at least one communication resource that is available for a wireless terminal to use for sidelink communication.

According to some embodiments, coordination of V2X sidelink resource may thus be provided for dual connectivity in cross-RAT (Radio Access Technology) scenarios by leveraging UE associated signaling. Accordingly, exchange of cell level resource pools between RAN nodes may be reduced thereby increasing efficiency of network signaling resource usage and/or reducing conflict between scheduling allocations from/between RAN nodes.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 9 is an abbreviated table illustrating an SGNB Addition Request Message according to some embodiments of inventive concepts;

FIG. 10 is an abbreviated table illustrating an SGNB Addition Request Acknowledge Message according to some embodiments of inventive concepts;

FIG. 11 is an abbreviated table illustrating an SGNB Modification Request Message according to some embodiments of inventive concepts;

FIG. 12 is an abbreviated table illustrating an SGNB Modification Request Acknowledge Message according to some embodiments of inventive concepts;

FIG. 13 is an abbreviated table illustrating an SGNB Modification Required Message according to some embodiments of inventive concepts;

FIG. 14 is an abbreviated table illustrating an SGNB Modification Confirm Message according to some embodiments of inventive concepts;

FIGS. 17A is a flow chart illustrating operations of a master RAN node according to some embodiments of inventive concepts;

FIG. 17B is a flow chart illustrating operations of a secondary RAN node according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 15:
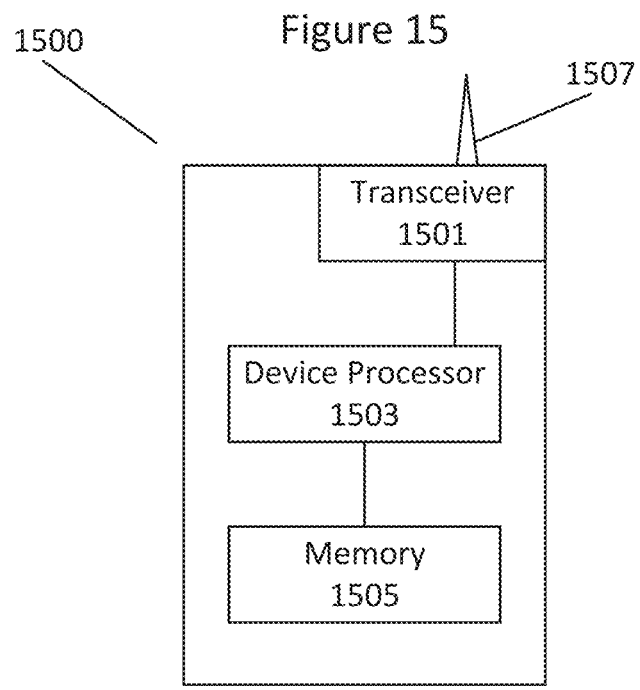
FIG. 15 is a block diagram of a wireless terminal according to some embodiments of inventive concepts.

FIG. 15 is a block diagram illustrating elements of a wireless terminal UE 1500 (also referred to as a wireless communication device, a wireless device, a wireless communication terminal, user equipment, UE, a user equipment node/terminal/device, etc.) configured to provide SL/V2X sidelink communication according to embodiments of inventive concepts. A sidelink communication is a communication mechanism of user data and/or control data between devices (e.g. vehicles or UEs) without going through a base station (e.g. e eNB or gNB) or without being controlled by a base station. As shown, wireless terminal UE 1500 may include a transceiver circuit 1501 (also referred to as a transceiver) including a transmitter and a receiver configured to provide uplink and downlink radio communications with a base station of a radio access network, and to provide SL/V2X sidelink communications (e.g., V2V and/or V2P communications) directly with other V2X wireless terminals. Wireless terminal UE 1500 may also include a processor circuit 1503 (also referred to as a processor) coupled to the transceiver circuit, and a memory circuit 1505 (also referred to as memory) coupled to the processor circuit. The memory circuit 1505 may include computer readable program code that when executed by the processor circuit 1503 causes the processor circuit to perform operations according to embodiments disclosed herein. According to other embodiments, processor circuit 1503 may be defined to include memory so that a separate memory circuit is not required. Wireless terminal UE may also include an interface (such as a user interface) coupled with processor 1503, and/or wireless communication device UE may be incorporated in a vehicle.

As discussed herein, operations of wireless terminal UE 1500 may be performed by processor 1503 and/or transceiver 1501. For example, processor 1503 may control transceiver 1501 to transmit communications through transceiver 1501 over a radio interface to another UE and/or to receive communications through transceiver 1501 from another UE over a radio interface. In addition, processor 1503 may control transceiver 1501 to receive communications through transceiver 1501 from Radio Access Network node (e.g., a base station, an eNodeB/eNB gNodeB/gNB, etc.). Moreover, modules may be stored in memory 1505, and these modules may provide instructions so that when instructions of a module are executed by processor 1503, processor 1503 performs respective operations (e.g., operations discussed below with respect to UEs).

Figure 16:
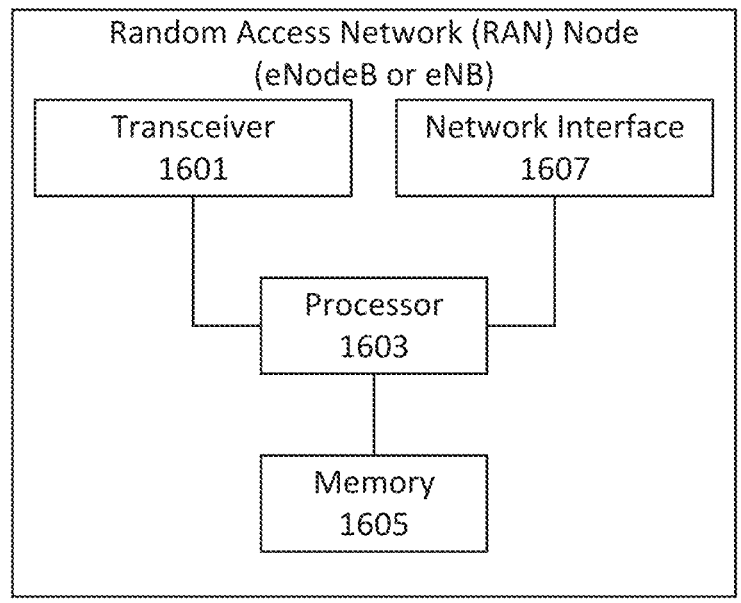
FIG. 16 is a block diagram of a network node according to some embodiments of inventive concepts.

FIG. 16 is a block diagram illustrating elements of a radio access network (RAN) node 1600 (also referred to as a network node, base station, eNB, eNodeB, gNB, gNodeB, core network entity node, etc.) of a wireless communication network configured to provide cellular communication according to embodiments of inventive concepts. As shown, the RAN node 1600 may include communication interface with a transceiver circuit 1601 and/or a network interface circuit 1607. A radio access network RAN node, for example, may include transceiver circuit 1601 for wireless communication with wireless terminals UEs and network interface circuit 1607 for communication with other RAN nodes and/or with core network entity nodes. A core network entity node may be provided as shown in FIG. 16 but omitting the transceiver circuit, and communications between such a core network entity node and a wireless terminal UE may be provided through the network interface circuit and a RAN node. Transceiver circuit 1601 (also referred to as a transceiver) may include a transmitter and a receiver configured to provide uplink and downlink radio communications with wireless terminals UEs. The RAN node may include a network interface circuit 1607 (also referred to as a network interface) configured to provide communications with other nodes (e.g., with other RAN nodes and/or core network entity nodes) of the RAN and/or core network. The RAN node may also include a processor circuit 1603 (also referred to as a processor) coupled to the transceiver circuit, and a memory circuit 1605 (also referred to as memory) coupled to the processor circuit. The memory circuit 1605 may include computer readable program code that when executed by the processor circuit 1603 causes the processor circuit to perform operations according to embodiments disclosed herein. According to other embodiments, processor circuit 1603 may be defined to include memory so that a separate memory circuit is not required.

As discussed herein, operations of the RAN node may be performed by processor 1603, network interface 1607, and/or transceiver 1601. For example, processor 1603 may control transceiver 1601 to transmit communications through transceiver 1601 over a radio interface to one or more wireless terminals UEs and/or to receive communications through transceiver 1601 from one or more wireless terminals UEs over a radio interface. Similarly, processor 1603 may control network interface 1607 to transmit communications through network interface 1607 to one or more other RAN nodes and/or to receive communications through network interface from one or more other RAN nodes. Moreover, modules may be stored in memory 1605, and these modules may provide instructions so that when instructions of a module are executed by processor 1603, processor 1603 performs respective operations (e.g., operations discussed below with respect to Example Embodiments 1-64).

In Rel-15, X2AP signaling for E-UTRA-NR UE-level resource coordination was introduced in 3GPP TS 36.423 V 15.4.0. A motivation for E-UTRA-NR UE-level resource coordination is to reduce/avoid that a UE in an EN-DC scenario is configured with an E-UTRA-NR carrier frequency combination that would lead to a 1TX and/or harmonic interference problems. The F1AP specification 3GPP TS 38.473 V15.4.1 defines containers for the transfer of E-UTRA -NR UE-level resource coordination information to the gNB-DU. The XnAP signaling is yet to be defined.

The E-UTRA-NR UE-level resource coordination signaling messages are exchanged between an eNB and gNB. The messages contain a bitmap that corresponds to the time-frequency resource grid, where each bit in the bitmap corresponds to one E-UTRA PRB (Physical Resource Block) pair. The bit value '1' in the bitmap means that the corresponding PRB pair is intended for UE scheduling (for the UE for which the resources are being coordinated) by the sending node. The bitmap is constructed with respect to the E-UTRA resource grid, which means that the NR node sending the coordination message must translate the NR resource allocation into the E-UTRA resource grid. For example, two adjacent NR PRB pairs for 30-kHz NR subcarrier spacing will correspond to four bits in the E-UTRA resource bitmap, because E-UTRA subcarrier spacing is 15 kHz.

Figure 1:
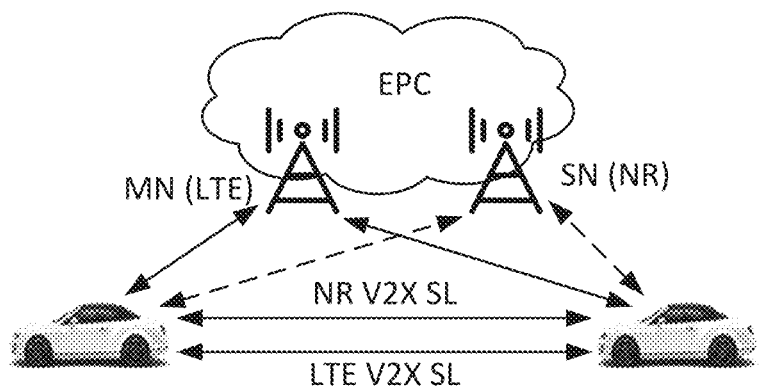
FIG. 1 illustrates a scenario (referred to as Scenario 1) where a UE's V2X communication in LTE SL and NR SL is controlled/configured by Uu while the UE is configured with EN-DC.
Figure 2:
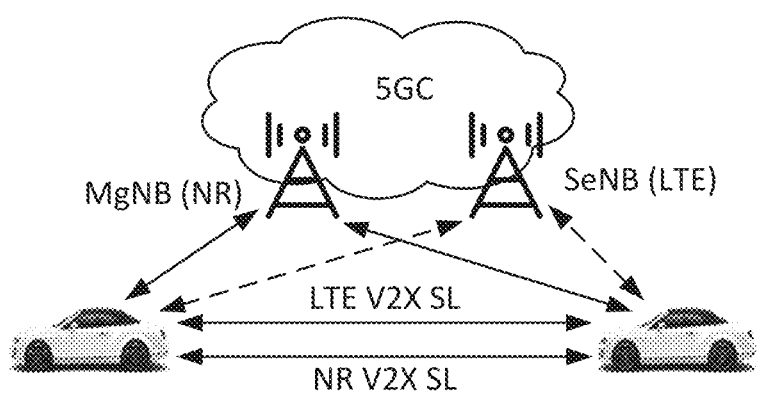
FIG. 2 illustrates a scenario (referred to as Scenario 2) where a UE's V2X communication in LTE SL and NR SL is controlled/configured by Uu while the UE is configured in NGEN-DC.
Figure 3:
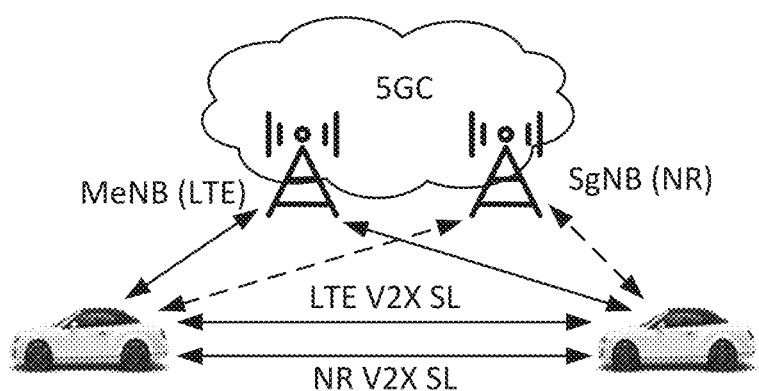
FIG. 3 illustrates a scenario (referred to as Scenario 3) where a UE's V2X communication in LTE SL and NR SL is controlled/configured by Uu while the UE is configured in NE-DC.
Figure 4:
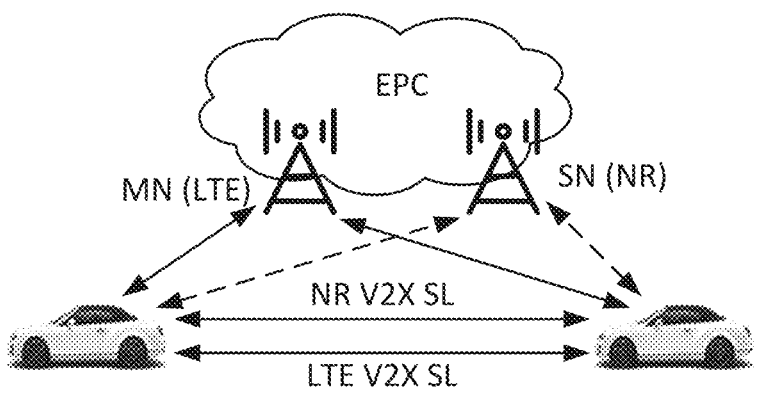
FIG. 4 illustrates an option (referred to as Option 3) where each NG-RAN node may handle only sidelink transmission of the same RAT.
Figure 5:
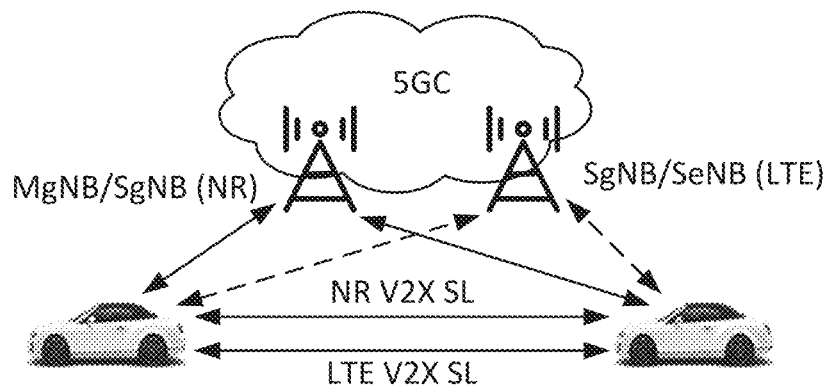
FIG. 5 illustrates an option (referred to as Option 4/7) where each NG-RAN node may handle only sidelink transmission of the same RAT.

One thing that may be needed for the NR V2X operation is the support for V2X resource coordination in MR-DC scenarios to provide resource coordination for cross-RAT V2X sidelink communication. If, for example, there is no support for mode-2 scheduling in another RAT, there may be a need to support this by MR-DC solutions, e.g. option 3, 4 and 7 (discussed with respect to FIGS. 4 and 5), where each node performs scheduling within its own RAT for the sidelink resources. In this case, each NG-RAN node may handle only sidelink transmission of the same RAT as shown in FIG. 4 (Option 3) and in FIG. 5 (options 4 and 7). According to some embodiments, signaling solutions may enable NR V2X UE cross-RAT sidelink resource coordination, which may be included in 3GPP TR 38.885 v1.0.0.

In Rel-14/15 LTE V2X, it was assumed that eNB could obtain the inter-cell sidelink resource pool configuration from OAM (Operations, Administration & Maintenance). However, OAM generally only manages the gNBs of one PLMN (Public Land Mobile Network) and may not be aware of the sidelink resource configuration of the neighboring gNB of another PLMN. Furthermore, it is possible that the two nodes in MR-DC scenario are managed by different OAM systems, as well as the scenario where a gNB-DU and gNB-CU of the same gNB are managed by different OAM systems. Consequently, the OAM-based solution may not be suitable for supporting the NR V2X SL operation.

Accordingly, the Master Node (MN) and the Secondary Node (SN) may need to provide V2X scheduling sidelink information to each other related to NR mode-2 in all MR-DC scenarios, via proper inter-node signaling. According to some embodiments, it is proposed that MR-DC support of V2X cross-RAT provisioning should be enabled by proper inter-node signaling between MN and SN, and vice-versa. According to some other embodiments, it is proposed that the X2/Xn signalling should contain the intended resource allocation for the V2X UE and additional V2X-specific information. Coordination of V2X sidelink resources for MR-DC in mode-2 may be enabled by leveraging existing mechanisms for UE-associated signaling between MN and SN introduced in TS 36.423, for example, the MeNB resource Coordination information IE defined in clause 9.2.116 and the Mobility V2X Services Authorized IE, defined in clause 9.2.93, of TS 36.423, and the V2X SgNB resource Coordination information IE, which is the SgNB resource Coordination information IE defined in clause 9.2.117 of TS 36.423. According to some other embodiments, it is proposed to add the TP in TR 38.885 for MR-DC cross-RAT sidelink resource coordination. Resource coordination in MR-DC is also discussed in R3-195937.

Some embodiments of the present disclosure propose signaling between MN (master RAN node) and SN (Secondary RAN node) to enable V2X sidelink communication. The signaling may include messages from MN to SN and vice versa. The messages may contain the intended resource allocation for the V2X UE and additional V2X-specific information.

Some embodiments of the present disclosure may enable coordination of V2X sidelink resources for dual connectivity DC by leveraging UE-associated signaling.

Some embodiments may also reduce/avoid the exchange of cell-level V2X resource pools between the MN and SN nodes over non-UE-associated signaling. Such cell-level exchange, without additional knowledge of the neighbor cell deployment and served V2X UE positions, might result in a suboptimal radio resource allocation at the receiving node and/or in a waste of network signaling resources. In fact, cell-level resources (which are provided via broadcast signaling) are typically configured in a static way, irrespective of the amount of UEs which are interested in SL operations in such cell. On the other hand, UE-dedicated resource allocation (which can be achieved either via mode-1 or mode-2 configuration) may be dimensioned such that UE traffic requirements are fulfilled, and it may be desirable that such resources are not interfered by other concurrent transmissions in neighboring cells. In particular, in the case of MR-DC configuration, in which a UE can receive scheduling allocation from both MN and SN, it may be important that some level of coordination is provided/guaranteed in order to reduce/avoid conflicts between the scheduling allocations from the MN and SN.

Some embodiments of inventive concepts are presented on a non-limiting example of EN-DC and the corresponding X2AP signaling, whereas embodiments of the present disclosure may also apply to any other type of dual connectivity, e.g. NGEN-DC, NE-DC etc. The following embodiments address MN and SN operations where the MN and the SN can be any of the eNB/gNB nodes operating in any of the above possible MR-DC configurations.

The sidelink resource coordination may be executed as follows:

In a first step, at SeNB addition request or configuration request procedure, the MN may indicate to the SN the sidelink resources it has configured for the V2X UE. This message may be triggered by the MN towards one SN, only depending on certain conditions, e.g. if the UE is configured for MR-DC operation with such MN and SN, and it is not capable in terms of TX/RX chains to perform at the same time SL operations in the frequency controlled by the MN, and uplink UL and/or sidelink SL operations in the frequency controlled by the concerned SN. Similarly, the message can be sent if the UE does not have at a given point time, enough power budget to provide/guarantee simultaneous communication with both MN and SN.

The initiating message may include:
  a. A bitmap indicating which time-frequency resources are scheduled for the V2X UE, herein referred to as V2X MeNB Resource Coordination Information IE (Information Element).
  b. The corresponding cell identifier.
  c. The frequency to which the resources signaled in the bitmap refers to.
  d. The V2X authorization information to for the V2X UE, herein referred to as V2X Services Authorized IE.
  e. The priority of the SL traffic that is transmitted by the UE when using the resources indicated in the bitmap. For example, the MN may configure the UE with an association between traffic types and the aforementioned bitmap. The MN will then indicate such association to the SN. The priority can be represented by any traffic priority tag which reflects QoS requirements such as QCI (QoS Class Identifier), 5QI (5G QoS Indicator), VQI (Voice Quality Index), PPPP (Pro-Se Per Packet Priority), etc. The priority may be indicated per resources, i.e. per bit, or can be common for all the resources addressed by the bitmap.

In a second step, based on the received information, the SN may realize which resources the UE uses for sidelink and may refrain from scheduling other users or this UE for Uu and/or SL operations in those resources at those particular time instances. In one embodiment, the SN may perform such operations taking into account the above signaled priority from the MN, and the priority of the UL traffic or SL traffic that the SN intends to schedule in a given slot in those resources signaled in the bitmap. The priority of the UL traffic or SL traffic that a UE may transmit in a UL/SL grant can be estimated from the BSR (Buffer Status Report) or SL-BSR, e.g., taking into account the LCID (Logical Channel Identifier)/LCG (Logical Channel Group) of data in the UL/SL buffer.

For example, the SN will not schedule a UE in a given UL/SL time resource in the cell controlled by the SN, if the priority of the SL traffic as indicated by the MN for that time resource is above a certain threshold, irrespective of the priority of the UL/SL traffic that the SN estimates for such UE. In another example, the SN schedules the UE for UL/SL operations in a given slot resource if the priority of the UL/SL traffic is above a certain threshold, irrespective of the priority of the SL traffic that the MN indicates for the concerned time resource.

In a third step, SN may reply to the MN, and it may include the SN resource allocation information for the V2X UE, herein referred to as V2X SgNB Resource Coordination Information IE. In one case, such SN resource allocation information can be just an acknowledgment of the previously provisioned bitmap, e.g. a flag or bit indicating if the previously received bitmap is acceptable by the SN. In another case, the SN resource allocation information may contain another bitmap indicating which time resources will be used by the SN for UL/SL scheduling. For example, the SN, upon comparing the priority of the UL/SL traffic that it intends to schedule in a given TTI with the priority of the SL traffic for that slot as indicated in the bitmap provided by the MN (as per the second step), can determine whether such slot should be used by the MN or SN. In another case, the SN indicates another set of SL resources that can be scheduled by the MN and that are not conflicting with any other UL/SL operations in the SN.

Depending on the content of the message from the SN, the MN may reconfigure the UE with a new set of SL resources, i.e. a new SL resource pool configuration may be provided to the UE, by taking into account such received message. The MN may also de-configure a SL resource pool previously configured, or MR-DC operations with the concerned SN.

In another embodiment, the coordination action may be initiated from the SN, and the MN may confirm or reject the V2X resource allocation proposed by the SN. In case the V2X services authorization for the UE has changed, the MN may include the V2X services authorized IE in the reply message back to the SN.

In another embodiment, the resource coordination information may include in addition to time-frequency resources, beam information or other spatial division multiplexing information.

In another embodiment, the resource coordination information may be represented in some way other than bitmap, e.g. by explicit indication or analytical description of allocated resources.

In another embodiment, in the first step, the MN may indicate in the bitmap the resources which are configured for SL reception for this UE. The message may include the same content as the one disclosed above for SL transmission. In the second step, similar as the second step above, the SN may refrain from scheduling downlink DL transmissions or sidelink SL reception resources in the same reception resources signaled by the MN. The third step may follow a same logic as the third step for the SL transmission case.

A detailed description of some embodiments is presented on a non-limiting example of EN-DC and the corresponding X2AP signaling, whereas proposed embodiments can also be applied to any other type of dual connectivity, e.g. NGEN-DC, NE-DC etc.

Figure 6:
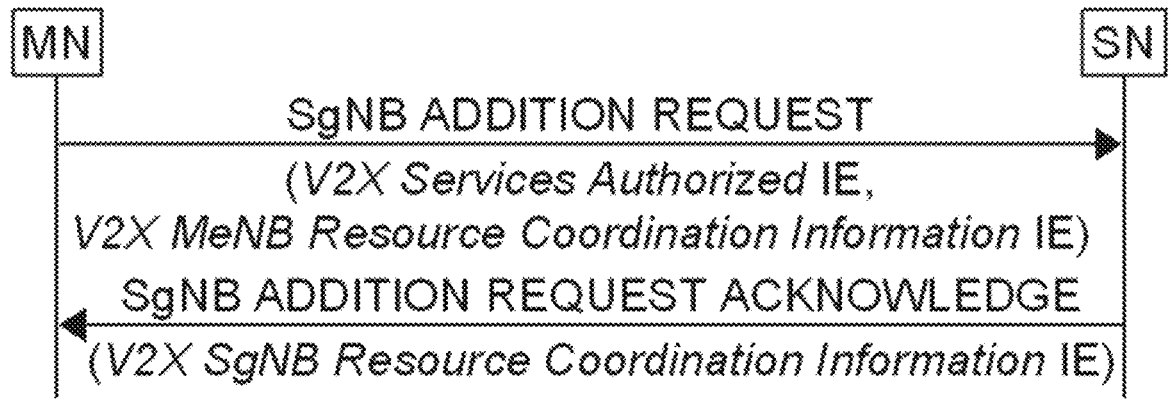
FIGS. 6, 7, and 8 are message diagrams illustrating communication of messages according to some embodiments of inventive concepts.
Figure 7:
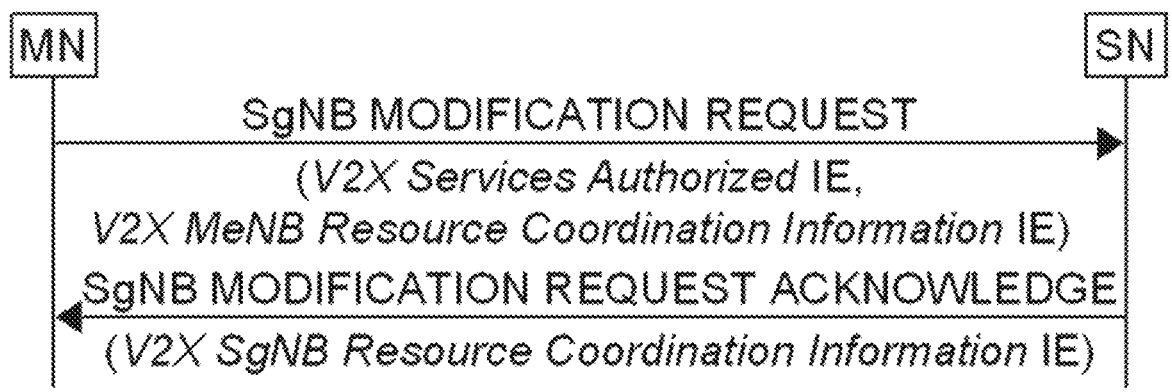
Figure 8:
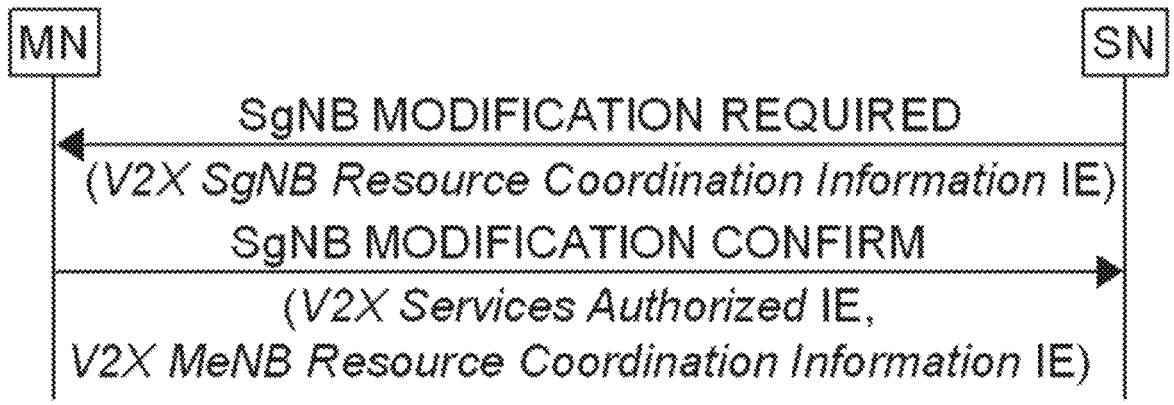

Non-limiting examples of adding information of some embodiments into existing X2AP signaling, including signaling charts, are illustrated in the message diagrams of FIGS. 6, 7, and 8, and in the messages of FIGS. 9, 10, 11, 12, 13, and 14 (including information elements V2X Services Authorized and/or V2X MeNB Resource Coordination Information, and/or V2X SgNB Resource Coordination Information). Some embodiments of inventive concepts may also be applied/added to existing XnAP and/or F1AP signaling in a similar way.

Signaling Charts, Messages and Information elements for Dual Connectivity procedures are discussed below with respect to FIGS. 6-14.

FIG. 6 illustrates communication of the SgNB Addition Request and SgNB Addition Request Acknowledge messages between master and secondary nodes (MN and SN) according to some embodiments of inventive concepts. These messages and elements thereof are discussed below with respect to FIGS. 9 and 10.

FIG. 7 illustrates communication of the SgNB Modification Request and SgNB Modification Request Acknowledge messages between master and secondary nodes (MN and SN) according to some embodiments of inventive concepts. These messages and elements thereof are discussed below with respect to FIGS. 11 and 12.

FIG. 8 illustrates communication of the SgNB Modification Required and SgNB Modification Confirm messages between master and secondary nodes (MN and SN) according to some embodiments of inventive concepts. These messages and elements thereof are discussed below with respect to FIGS. 13 and 14.

The SGNB ADDITION REQUEST message may be sent by the MeNB to the en-gNB to request the preparation of resources for EN-DC operation for a specific UE Direction: MeNB→en-gNB.

FIG. 9 is an abbreviated table illustrating elements of the SGNB Addition Request message according to some embodiments of inventive concepts.

The SGNB ADDITION REQUEST ACKNOWLEDGE message may be sent by the en-gNB to confirm the MeNB about the SgNB addition preparation.

Direction: en-gNB→MeNB.

FIG. 10 is an abbreviated table illustrating elements of the SGNB Addition Request Acknowledge message according to some embodiments of inventive concepts.

The SGNB MODIFICATION REQUEST message may be sent by the MeNB to the en-gNB to request the preparation to modify en-gNB resources for a specific UE, to query for the current SCG configuration, or to provide the S-RLF-related information to the en-gNB.

Direction: MeNB→en-gNB.

FIG. 11 is an abbreviated table illustrating elements of the SGNB Modification Request message according to some embodiments of inventive concepts.

The SGNB MODIFICATION REQUEST ACKNOWLEDGE message may be sent by the en-gNB to confirm the MeNB's request to modify the en-gNB resources for a specific UE.

Direction: en-gNB→MeNB.

FIG. 12 is an abbreviated table illustrating elements of the SGNB Modification Request Acknowledge message according to some embodiments of inventive concepts.

The SGNB MODIFICATION REQUIRED message may be sent by the en-gNB to the MeNB to request the modification of en-gNB resources for a specific UE.

Direction: en-gNB→MeNB.

FIG. 13 is an abbreviated table illustrating elements of the SGNB Modification Required message according to some embodiments of inventive concepts.

The SGNB MODIFICATION CONFIRM message may be sent by the MeNB to inform the en-gNB about the successful modification.

Direction: MeNB→en-gNB.

FIG. 14 is an abbreviated table illustrating elements of the SGNB Modification Confirm message according to some embodiments of inventive concepts.

The core network CN and higher radio access network RAN functions may be implemented as software functions running in a virtualized environment according to some embodiments of inventive concepts.

According to some embodiments of inventive concepts, signaling may be provided to enable New Radio NR V2X UE cross-RAT sidelink resource coordination.

Operations of RAN nodes 1600 will now be discussed with reference to the flow charts of FIGS. 17A and 17B and FIGS. 18A and 18B according to some embodiments of inventive concepts. For example, modules may be stored in memory 1605 of FIG. 16, and these modules may provide instructions so that when the instructions of a module are executed by a respective RAN node processor 1603, processor 1603 performs respective operations of the respective flow chart.

FIG. 17A illustrates operations of a master RAN node MN initiating transmission of resource coordination information to a secondary RAN node SN, with the master and secondary RAN nodes MN and SN together providing dual connectivity, DC, communication for a wireless terminal. FIG. 17B illustrates corresponding operations of the secondary RAN node SN. Each of the master RAN node MN of FIG. 17A and the secondary RAN node SN of FIG. 17B may be provided according to the structure illustrated in FIG. 16. Moreover, the master and secondary RAN nodes MN and SN may be physically separate RAN nodes operating according to different Radio Access Technologies, RATs.

At block 1701 of FIG. 17A, processor 1603 of the master RAN node MN may allocate at least one communication resource that is available for the wireless terminal to use for sidelink SL communication. For example, the SL communication may be V2X communication.

At block 1703 of FIG. 17A, processor 1603 of the master RAN node MN may transmit first resource coordination information through network interface 1607 to a secondary RAN node SN, wherein the first resource coordination information defines the at least one communication resource that is available for the wireless terminal to use for sidelink communication. For example, the first resource coordination information may be transmitted as an information element of a secondary RAN node SN addition request message (e.g., a SgnB Addition Request message as discussed above with respect to FIGS. 6 and 9) or a secondary RAN node SN modification request message (e.g., a SgnB Modification Request message as discussed above with respect to FIGS. 7 and 11). In addition, the resource coordination information may be transmitted with an indication of a priority associated with sidelink communications for the wireless terminal using the at least one communication resource.

At block 1705 of FIG. 17A, processor 1603 of the master RAN node MN may receive (through network interface 1607) second resource coordination information from the secondary RAN node SN, wherein the second resource coordination information is responsive to the first resource coordination information. According to some embodiments, the second resource coordination information may include an acknowledgement of the first resource coordination information, and/or the second resource coordination information may define at least one communication resource that will be used by the secondary RAN node SN to schedule communications for the wireless terminal. For example, the second resource coordination information may be received as an information element of a secondary RAN node SN addition request acknowledge message (e.g., a SgnB Additional Request Acknowledge message as discussed above with respect to FIGS. 6 and 10) or a secondary RAN node SN modification request acknowledge message (e.g., a SgnB Modification Request Acknowledge message as discussed above with respect to FIGS. 7 and 12).

At block 1707 of FIG. 17A, processor 1603 of the master RAN node MN may transmit an indication of the at least one resource that is available for the wireless terminal to use for SL communication through transceiver 1601 to the wireless terminal.

Various operations from the flow chart of FIG. 17A may be optional with respect to some embodiments of RAN nodes and related methods. Regarding methods of example embodiment 1 (set forth below), for example, operations of blocks 1701, 1705, and 1707 of FIG. 17A may be optional.

At block 1751 of FIG. 17B, processor 1603 of the secondary RAN node SN may receive (through network interface 1607) the first resource coordination information from the master RAN node MN (e.g., from block 1703 of FIG. 17B), wherein the first resource coordination information defines at least one communication resource that is available for the wireless terminal to use for sidelink communication. For example, the first resource coordination information may be received as an information element of a secondary RAN node SN addition request message (e.g., a SgnB Addition Request message as discussed above with respect to FIGS. 6 and 9) or a secondary RAN node SN modification request message (e.g., a SgnB Modification Request message as discussed above with respect to FIGS. 7 and 11). In addition, the resource coordination information may be received with an indication of a priority associated with sidelink communications for the wireless terminal using the at least one communication resource.

At block 1753 of FIG. 17B, processor 1603 of the secondary RAN node SN may schedule uplink, downlink, and/or sidelink communications for the wireless terminal based on the first resource coordination information received from the master RAN node MN. If the first resource coordination information is received with an indication of a priority associated with sidelink communications for the wireless terminal using the at least one communication resource, scheduling may be further based on the indication of priority.

At block 1755 of FIG. 17B, processor 1603 of the secondary RAN node SN may transmit the second resource coordination information from through network interface 1607 to the master RAN node MN (e.g., to block 1705 of FIG. 17A), wherein the second resource coordination information is responsive to the first resource coordination information. According to some embodiments, the second resource coordination information may include an acknowledgement of the first resource coordination information, and/or the second resource coordination information may define at least one communication resource that will be used by the secondary RAN node SN to schedule communications for the wireless terminal. For example, the second resource coordination information may be transmitted as an information element of a secondary RAN node SN addition request acknowledge message (e.g., a SgnB Additional Request Acknowledge message as discussed above with respect to FIGS. 6 and 10) or a secondary RAN node SN modification request acknowledge message (e.g., a SgnB Modification Request Acknowledge message as discussed above with respect to FIGS. 7 and 12).

Various operations from the flow chart of FIG. 17B may be optional with respect to some embodiments of RAN nodes and related methods. Regarding methods of example embodiment 34 (set forth below), for example, operations of blocks 1753 and 1755 of FIG. 17B may be optional.

Figure 18A:
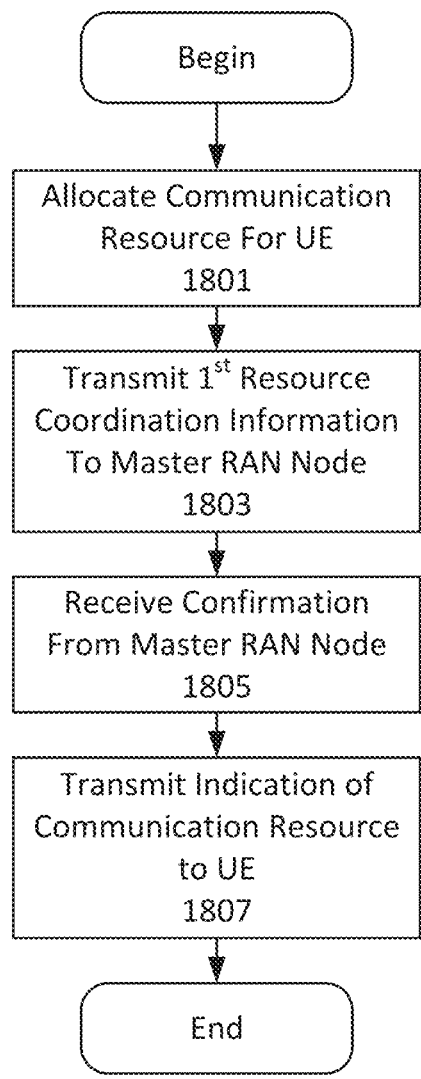
FIG. 18A is a flow chart illustrating operations of a secondary RAN node according to some embodiments of inventive concepts.
Figure 18B:
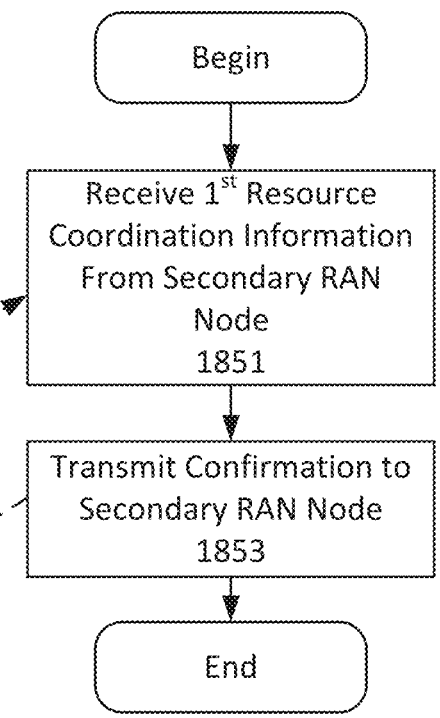
FIG. 18B is a flow chart illustrating operations of a master RAN node according to some embodiments of inventive concepts.

FIG. 18A illustrates operations of a secondary RAN node SN initiating transmission of resource coordination information to a master RAN node MN, and FIG. 18B illustrates corresponding operations of the master RAN node MN. Each of the secondary RAN node SN of FIG. 18A and the master RAN node MN of FIG. 18B may be provided according to the structure illustrated in FIG. 16. Moreover, the secondary and master RAN nodes SN and MN may be physically separate RAN nodes operating according to different Radio Access Technologies, RATs.

At block 1801 in FIG. 18A, secondary RAN node SN processor 1603 may allocate at least one communication resource that is available for a wireless terminal to use for sidelink SL communication.

At block 1803 in FIG. 18A, secondary RAN node SN processor 1603 may transmit resource coordination information through network interface 1607 to the master RAN node MN, wherein the resource coordination information defines at least one communication resource that is available for a wireless terminal to use for sidelink communication. For example, the resource coordination information may be transmitted as an information element of a secondary RAN node SN modification required message (e.g., a SgnB Modification Required message discussed above with respect to FIGS. 8 and 13).

At block 1805 in FIG. 18A, secondary RAN node SN processor 1603 may receive a confirmation (through network interface 1607) from the master RAN node MN with respect to the resource coordination information. For example, the confirmation may be received as an information element of a secondary RAN node SN modification confirm message (e.g., a SgnB Modification Confirm message as discussed above with respect to FIGS. 8 and 14).

At block 1807 in FIG. 18A, secondary RAN node SN processor 1603 may transmit an indication of the at least one resource that is available for the wireless terminal to use for SL communication through transceiver 1601 to the wireless terminal responsive to receiving the confirmation.

Various operations from the flow chart of FIG. 18A may be optional with respect to some embodiments of RAN nodes and related methods. Regarding methods of example embodiment 1 (set forth below), for example, operations of blocks 1801, 1805, and 1807 of FIG. 18A may be optional.

At block 1851 in FIG. 18B, master RAN node MN processor 1603 may receive the resource coordination information (from block 1803 of FIG. 18A) through network interface 1607 from the secondary RAN node SN, wherein the resource coordination information defines at least one communication resource that is available for a wireless terminal to use for sidelink communication. As discussed above with respect to block 1803, the resource coordination information may be received as an information element of a secondary RAN node SN modification required message (e.g., a SgnB Modification Required message discussed above with respect to FIGS. 8 and 13).

At block 1853 in FIG. 18B, master RAN node MN processor 1603 may transmit a confirmation through network interface 1607 to the secondary RAN node SN with respect to the resource coordination information. As discussed above with respect to block 1805, the confirmation may be transmitted as an information element of a secondary RAN node SN modification confirm message (e.g., a SgnB Modification Confirm message as discussed above with respect to FIGS. 8 and 14).

Various operations from the flow chart of FIG. 18B may be optional with respect to some embodiments of RAN nodes and related methods. Regarding methods of example embodiment 34 (set forth below), for example, operations of block 1853 of FIG. 18B may be optional.

Further discussion of inventive concepts is provided in the document "Resource Coordination For cross-RAT V2X sidelink communication" which is attached to the end of this disclosure as Appendix A.

Example embodiments of inventive concepts are set forth below.

1. A method of operating a first radio access network, RAN, node in a wireless communication network, the method comprising: transmitting (1703, 1803) resource coordination information from the first RAN node to a second RAN node, wherein the resource coordination information defines at least one communication resource that is available for a wireless terminal to use for sidelink communication.

2. The method according to Embodiment 1, wherein the resource coordination information includes a bitmap defining the at least one communication resource that is available for the wireless terminal to use for sidelink communication.

3. The method according to Embodiment 2, wherein each bit of the bitmap corresponds to a time and frequency resource, wherein a first value of a bit of the bitmap indicates that the respective time and frequency resource is available for the wireless terminal to use for sidelink communication, and wherein a second value of a bit of the bitmap indicates that the respective time and frequency resource is not available for the wireless terminal to use for sidelink communication.

4. The method according to Embodiment 2, wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

5. The method according to Embodiment 4, wherein the resource coordination information further includes an indication of a frequency resource associated with the bitmap.

6. The method according to any of Embodiments 1-5, wherein transmitting comprises transmitting the resource coordination information with a cell identifier of the first RAN node.

7. The method according to any of Embodiments 1-6, wherein the sidelink communication comprises a vehicle-to-anything, V2X, communication, and wherein transmitting comprises transmitting the resource coordination information with V2X authorization information.

8. The method according to Embodiment 7, wherein the V2X authorization information indicates that the wireless terminal is authorized to provide V2X communication as a pedestrian and/or as a vehicle.

9. The method according to any of Embodiments 1-8, wherein transmitting comprises transmitting the resource coordination information with an indication of a priority associated with sidelink communications for the wireless terminal using the at least one communication resource.

10. The method according to Embodiment 9, wherein the priority is based on a quality of service, QoS, requirement of the sidelink communications for the wireless terminal using the at least one communication resource.

11. The method according to any of Embodiments 1-10, wherein transmitting comprises transmitting the resource coordination information with spatial division multiplexing information (e.g., beam information) associated with the wireless terminal.

12. The method according to any of Embodiments 1-11, wherein transmitting the resource coordination information comprises transmitting a secondary RAN node addition request message (e.g., a SgnB Addition Request message) to the second RAN node to request preparation of resources for dual connectivity communication for the wireless terminal, wherein the resource coordination information is included as an information element of the secondary RAN node addition request message.

13. The method according to any of Embodiments 1-11, wherein transmitting the resource coordination information comprises transmitting a secondary RAN node modification request message (e.g., a SgnB Modification Request message) to the second RAN node to request modification of resources for dual connectivity communication for the wireless terminal, wherein the resource coordination information is included as an information element of the secondary RAN node modification request message.

14. The method according to any of Embodiments 1-11, wherein transmitting the resource coordination information comprises transmitting a secondary RAN node modification required message (e.g., a SgnB Modification Required message) to the second RAN node to request modification of resources for dual connectivity communication for the wireless terminal, wherein the resource coordination information is included as an information element of the secondary RAN node modification required message.

15. The method according to any of Embodiments 1-14, wherein the resource coordination information is first resource coordination information, the method further comprising: receiving (1705) second resource coordination information at the first RAN node from the second RAN node, wherein the second resource coordination information is responsive to the first resource coordination information.

16. The method according to Embodiment 15, wherein the second resource coordination information includes an acknowledgement of the first resource coordination information.

17. The method according to Embodiment 15, wherein the second resource coordination information defines at least one communication resource that will be used by the second RAN node to schedule communications for the wireless terminal.

18. The method according to Embodiment 15, wherein the second resource coordination information defines at least one communication resource that will be used by the second RAN node to schedule sidelink, uplink, and/or downlink communications for the wireless terminal.

19. The method according to Embodiment 15, wherein the second resource coordination information defines at least one alternative communication resource that is available for the wireless terminal to use for sidelink communication, wherein the second resource coordination information is different than the first resource coordination information.

20. The method according to any of Embodiments 15-19, wherein receiving the second resource coordination information comprises receiving a secondary RAN node addition request acknowledge message (e.g., a SgnB Additional Request Acknowledge message) from the second RAN node to confirm addition of the second RAN node for dual connectivity, DC, communication with the wireless terminal, wherein the second resource coordination information is included as an information element of the secondary RAN node addition request acknowledge message.

21. The method according to any of Embodiments 15-19, wherein receiving the second resource coordination information comprises receiving a secondary RAN node modification request acknowledge message (e.g., a SgnB Modification Request Acknowledge message) from the second RAN node to confirm modification of dual connectivity, DC, resources for the wireless terminal, wherein the second resource coordination information is included as an information element of the secondary RAN node modification acknowledge message.

22. The method according to any of Embodiments 15-19, wherein receiving the second resource coordination information comprises receiving a secondary RAN node modification confirm message (e.g., a SgnB Modification Confirm message) from the second RAN node to confirm successful modification of dual connectivity, DC, resources for the wireless terminal, wherein the second resource coordination information is included as an information element of the secondary RAN node modification confirm message.

23. The method of any of Embodiments 1-22 further comprising: transmitting (1707) an indication of the at least one resource that is available for the wireless terminal to use for SL communication from the first RAN node to the wireless terminal.

24. The method of any of Embodiments 1-23, wherein the first and second RAN nodes together provide dual connectivity, DC, communication for the wireless terminal.

25. The method of Embodiment 24, wherein the first RAN node acts as a master RAN node for the DC communication for the wireless terminal, and wherein the second RAN node acts as a secondary RAN node for the DC communication for the wireless terminal.

26. The method of any of Embodiments 1-25, wherein the sidelink communication comprises vehicle-to-anything, V2X, communication.

27. The method of any of Embodiments 1-6, wherein the first and second RAN nodes together provide dual connectivity, DC, communication for the wireless terminal, wherein the first RAN node acts as a secondary RAN node for the DC communication for the wireless terminal, and wherein the second RAN node acts as a master RAN node for the DC communication for the wireless terminal.

28. The method of Embodiment 27 further comprising: receiving (1805) a confirmation from the second RAN node with respect to the resource coordination information; and responsive to receiving the confirmation, transmitting (1807) an indication of the at least one resource that is available for the wireless terminal to use for SL communication from the first RAN node to the wireless terminal.

29. The method of any of Embodiments 1-28, wherein the resource coordination information defines at least one communication resource that is available for the wireless terminal to use for sidelink transmission.

30. The method of any of Embodiments 1-28, wherein the resource coordination information defines at least one communication resource that is available for the wireless terminal to use for sidelink reception.

31. The method of any of Embodiments 1-30, wherein the resource information is transmitted by the first RAN node responsive to the wireless terminal being configured for dual connectivity, DC (e.g., multi-radio dual connectivity, MR-DC), using the first and second RAN nodes.

32. The method of any of Embodiments 1-31, wherein the resource information is transmitted by the first RAN node responsive to the wireless terminal having a power budget that is insufficient to provide simultaneous communication with both the first and second RAN nodes.

33. The method of any of Embodiments 1-32, wherein the resource information is transmitted by the first RAN node responsive to a change in a time and/or frequency resource that is available for the wireless terminal to use for sidelink communication.

34. A method of operating a first radio access network, RAN, node in a wireless communication network, the method comprising: receiving (1751, 1851) resource coordination information at the first RAN node from a second RAN node, wherein the resource coordination information defines at least one communication resource that is available for a wireless terminal to use for sidelink communication.

35. The method according to Embodiment 34, wherein the resource coordination information includes a bitmap defining the at least one communication resource that is available for the wireless terminal to use for sidelink communication.

36. The method according to Embodiment 35, wherein each bit of the bitmap corresponds to a time and frequency resource, wherein a first value of a bit of the bitmap indicates that the respective time and frequency resource is available for the wireless terminal to use for sidelink communication, and wherein a second value of a bit of the bitmap indicates that the respective time and frequency resource is not available for the wireless terminal to use for sidelink communication.

37. The method according to Embodiment 35, wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

38. The method according to Embodiment 37, wherein the resource coordination information further includes an indication of a frequency resource associated with the bitmap.

39. The method according to any of Embodiments 34-38, wherein receiving comprises receiving the resource coordination information with a cell identifier of the second RAN node.

40. The method according to any of Embodiments 34-39, wherein the sidelink communication comprises a vehicle-to-anything, V2X, communication, and wherein receiving comprises receiving the resource coordination information with V2X authorization information.

41. The method according to Embodiment 40, wherein the V2X authorization information indicates that the wireless terminal is authorized to provide V2X communication as a pedestrian and/or as a vehicle.

42. The method according to any of Embodiments 34-41 further comprising: scheduling (1753) uplink, downlink, and/or sidelink communications for the wireless terminal based on the resource coordination information received from the second RAN node.

43. The method according to any of Embodiments 34-41, wherein receiving comprises receiving the resource coordination information with an indication of a priority associated with sidelink communications for the wireless terminal using the at least one communication resource.

44. The method according to Embodiment 43, wherein the priority is based on a quality of service, QoS, requirement of the sidelink communications for the wireless terminal using the at least one communication resource.

45. The method according to any of Embodiments 43-44 further comprising: scheduling (1753) uplink, downlink, and/or sidelink communications for the wireless terminal based on the resource coordination information received from the second RAN node and the indication of priority.

46. The method according to any of Embodiments 34-45, wherein receiving comprises receiving the resource coordination information with spatial division multiplexing information (e.g., beam information) associated with the wireless terminal.

47. The method according to any of Embodiments 34-46, wherein receiving the resource coordination information comprises receiving a secondary RAN node addition request message (e.g., a SgnB Addition Request message) from the second RAN node requesting preparation of resources for dual connectivity communication for the wireless terminal, wherein the resource coordination information is included as an information element of the secondary RAN node addition request message.

48. The method according to any of Embodiments 34-46, wherein receiving the resource coordination information comprises receiving a secondary RAN node modification request message (e.g., a SgnB Modification Request message) from the second RAN node requesting modification of resources for dual connectivity communication for the wireless terminal, wherein the resource coordination information is included as an information element of the secondary RAN node modification request message.

49. The method according to any of Embodiments 34-46, wherein receiving the resource coordination information comprises receiving a secondary RAN node modification required message (e.g., a SgnB Modification Required message) from the second RAN node requesting modification of resources for dual connectivity communication for the wireless terminal, wherein the resource coordination information is included as an information element of the secondary RAN node modification required message.

50. The method according to any of Embodiments 34-49, wherein the resource coordination information is first resource coordination information, the method further comprising: transmitting (1755) second resource coordination information from the first RAN node to the second RAN node, wherein the second resource coordination information is responsive to the first resource coordination information.

51. The method according to Embodiment 50, wherein the second resource coordination information includes an acknowledgement of the first resource coordination information.

52. The method according to Embodiment 50, wherein the second resource coordination information defines at least one communication resource that will be used by the first RAN node to schedule communications for the wireless terminal.

53. The method according to Embodiment 50, wherein the second resource coordination information defines at least one communication resource that will be used by the first RAN node to schedule sidelink, uplink, and/or downlink communications for the wireless terminal.

54. The method according to Embodiment 50, wherein the second resource coordination information defines at least one alternative communication resource that is available for the wireless terminal to use for sidelink communication, wherein the second resource coordination information is different than the first resource coordination information.

55. The method according to any of Embodiments 50-54, wherein transmitting the second resource coordination information comprises transmitting a secondary RAN node addition request acknowledge message (e.g., a SgnB Additional Request Acknowledge message) to the second RAN node to confirm addition of the first RAN node for dual connectivity, DC, communication with the wireless terminal, wherein the second resource coordination information is included as an information element of the secondary RAN node addition request acknowledge message.

56. The method according to any of Embodiments 50-54, wherein transmitting the second resource coordination information comprises transmitting a secondary RAN node modification request acknowledge message (e.g., a SgnB Modification Request Acknowledge message) to the second RAN node to confirm modification of dual connectivity, DC, resources for the wireless terminal, wherein the second resource coordination information is included as an information element of the secondary RAN node modification acknowledge message.

57. The method according to any of Embodiments 50-54, wherein transmitting the second resource coordination information comprises transmitting a secondary RAN node modification confirm message (e.g., a SgnB Modification Confirm message) to the second RAN node to confirm successful modification of dual connectivity, DC, resources for the wireless terminal, wherein the second resource coordination information is included as an information element of the secondary RAN node modification confirm message.

58. The method of any of Embodiments 34-57, wherein the first and second RAN nodes together provide dual connectivity, DC, communication for the wireless terminal.

59. The method of Embodiment 58, wherein the first RAN node acts as a secondary RAN node for the DC communication for the wireless terminal, and wherein the second RAN node acts as a master RAN node for the DC communication for the wireless terminal.

60. The method of any of Embodiments 34-59, wherein the sidelink communication comprises vehicle-to-anything, V2X, communication.

61. The method of any of Embodiments 34-39, wherein the first and second RAN nodes together provide dual connectivity, DC, communication for the wireless terminal, wherein the first RAN node acts as a master RAN node for the DC communication for the wireless terminal, and wherein the second RAN node acts as a secondary RAN node for the DC communication for the wireless terminal.

62. The method of Embodiment 61 further comprising: transmitting (1853) a confirmation to the second RAN node with respect to the resource coordination information.

63. The method of any of Embodiments 34-62, wherein the resource coordination information defines at least one communication resource that is available for the wireless terminal to use for sidelink transmission.

64. The method of any of Embodiments 34-62, wherein the resource coordination information defines at least one communication resource that is available for the wireless terminal to use for sidelink reception.

65. The method of any of Embodiments 1-64, wherein the first and second RAN nodes operate according to different Radio Access Technologies, RATs.

66. A first radio access network, RAN, node (1600) of a wireless communication network, the node comprising: a processor (1603); and memory (1605) coupled with the processor, wherein the memory includes instructions that when executed by the processor causes the RAN node to perform operations according to any of Embodiments 1-65.

67. A first radio access network, RAN, node (1600) of a wireless communication network, wherein the first RAN node is adapted to perform according to any of Embodiments 1-65.

68. A computer program comprising program code to be executed by at least one processor (1603) of a first radio access network, RAN, node (1600) of a wireless communication network, whereby execution of the program code causes the first RAN node (1600) to perform operations according to any one of embodiments 1-65.

69. A computer program product comprising a non-transitory storage medium including program code to be executed by at least one processor (1603) of a first radio access network, RAN, node (1600) of a wireless communication network, whereby execution of the program code causes the first RAN node (1600) to perform operations according to any one of embodiments 1-65.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 19:
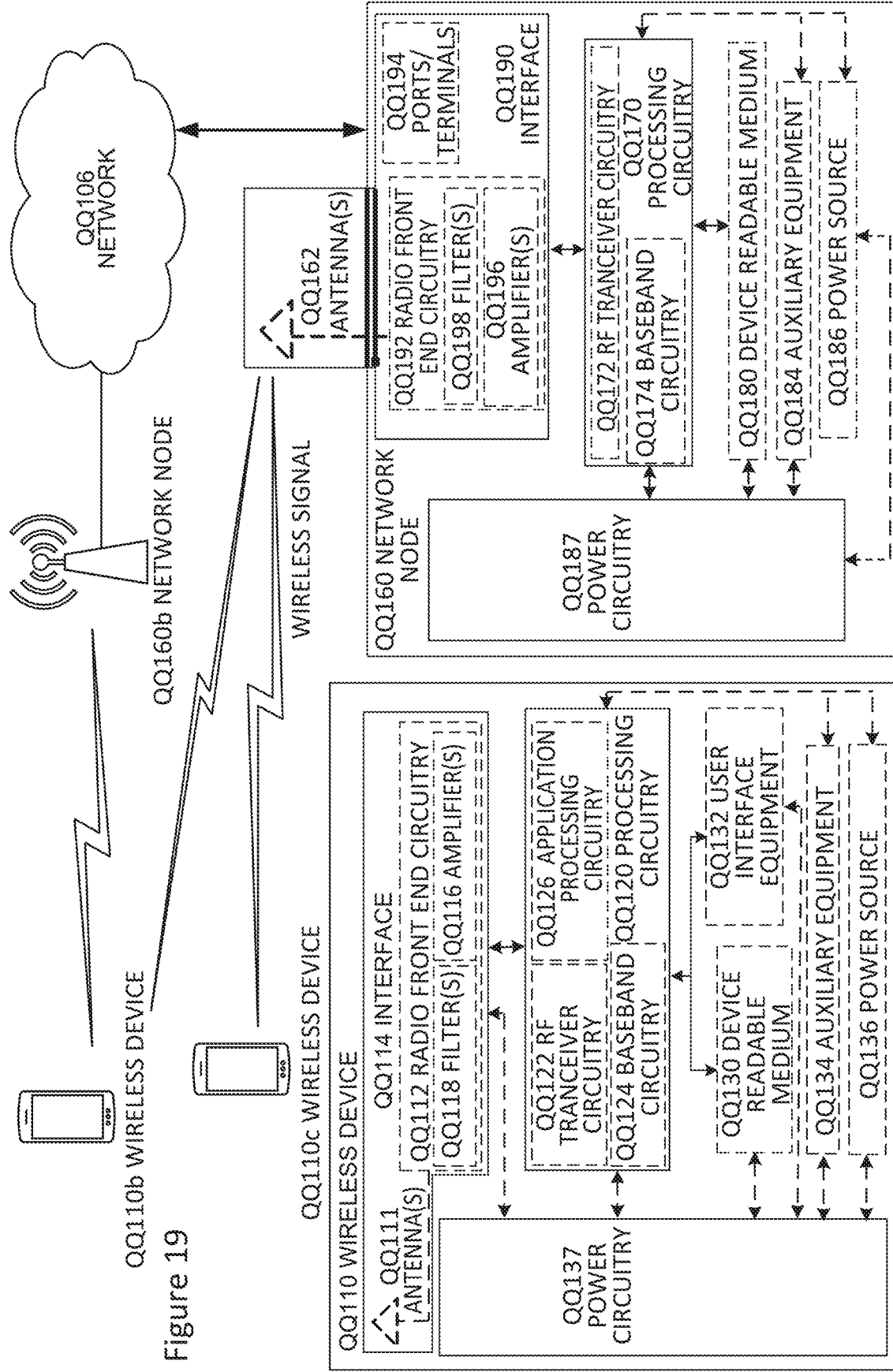
FIG. 19 is a block diagram of a wireless network in accordance with some embodiments.

FIG. 19: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G (5th Generation) standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR (New Radio) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160 but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 19 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 20:
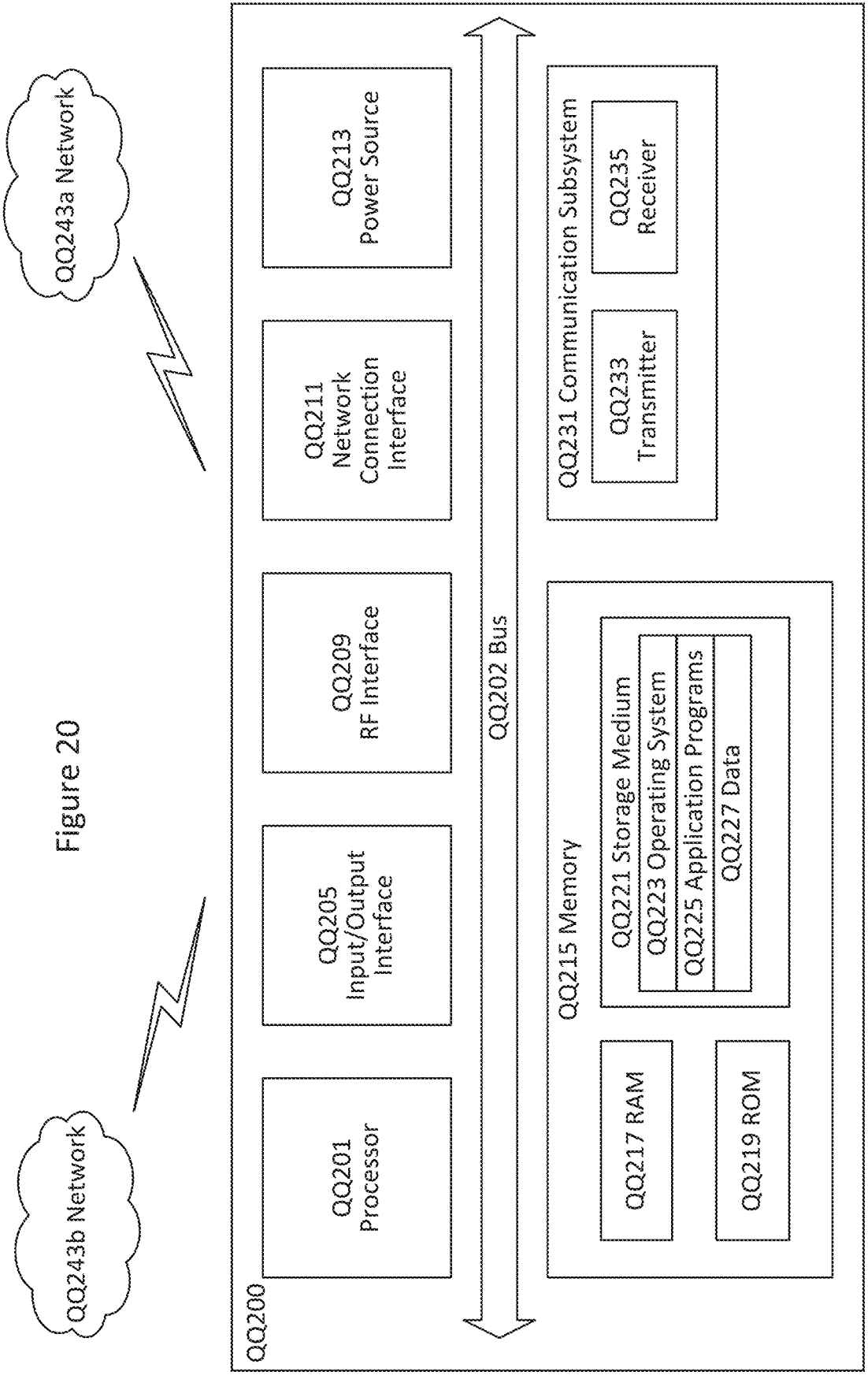
FIG. 20 is a block diagram of a user equipment in accordance with some embodiments

FIG. 20: User Equipment in accordance with some embodiments

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EE- PROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 20, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 21:
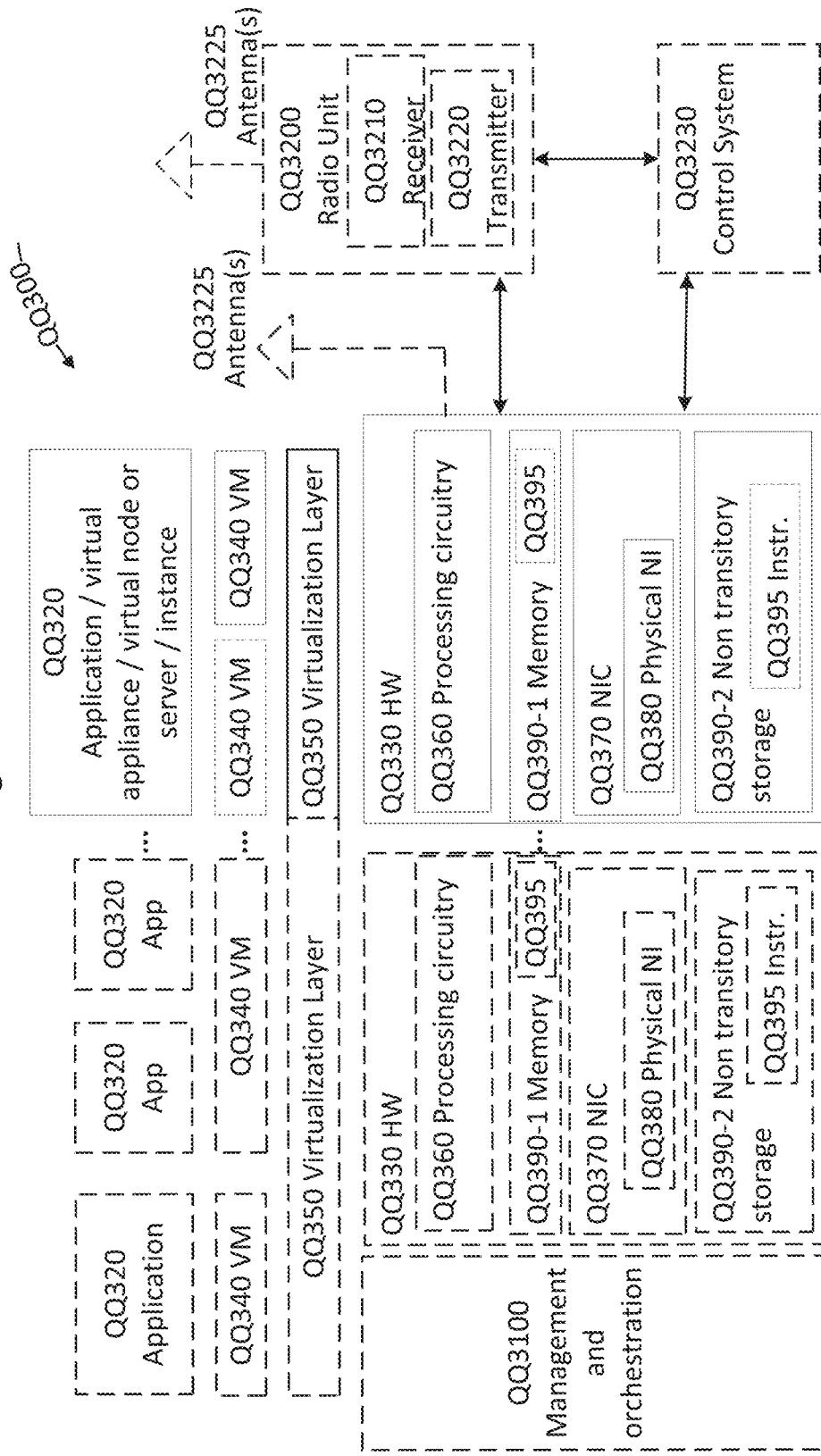
FIG. 21 is a block diagram of a virtualization environment in accordance with some embodiments.

FIG. 21: Virtualization environment in accordance with some embodiments

FIG. 21 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 21, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 21.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 22:
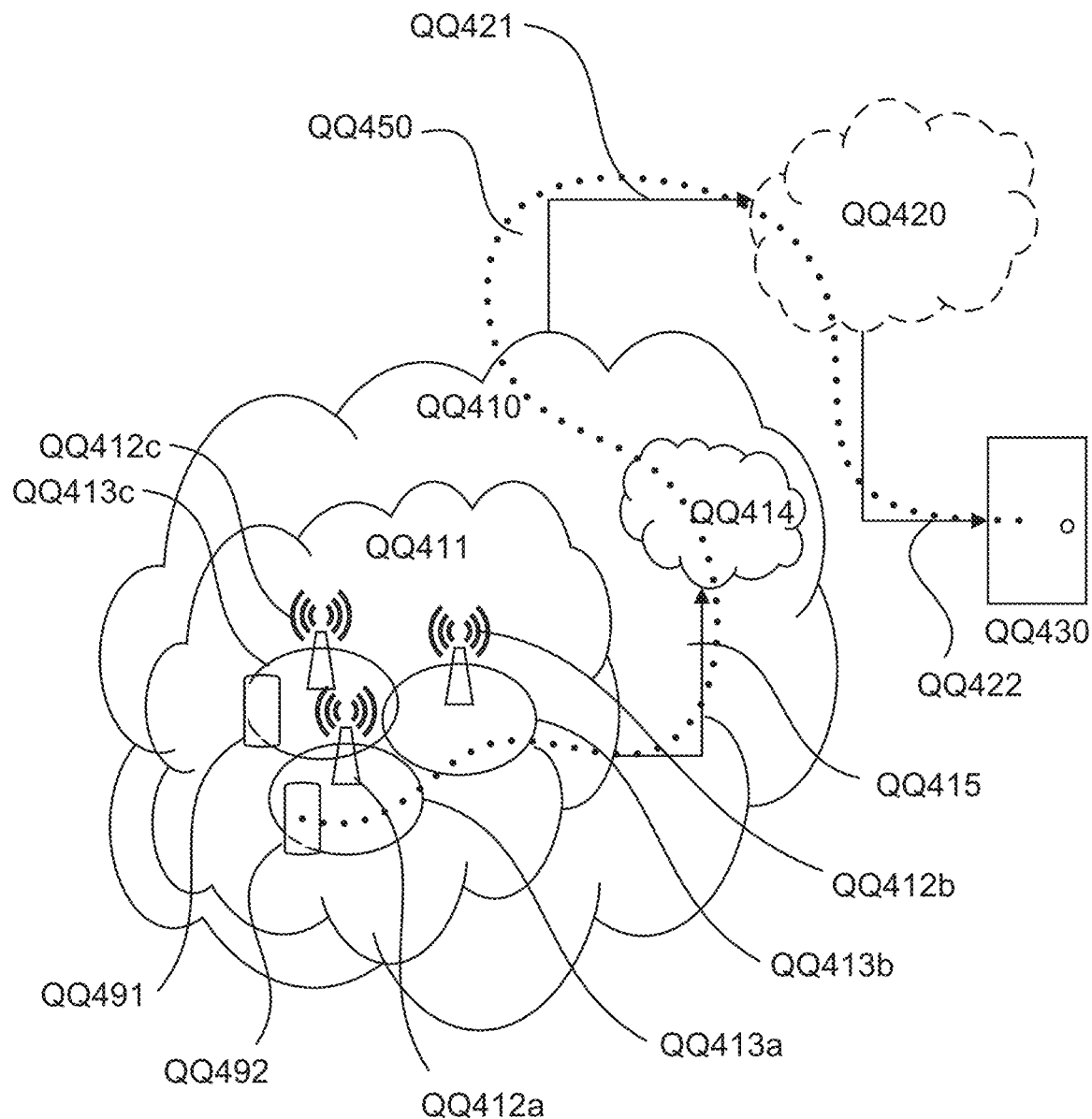
FIG. 22 is a block diagram of a telecommunication network connected via an intermediate network to a host computer in accordance with some embodiments.

FIG. 22: Telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 23:
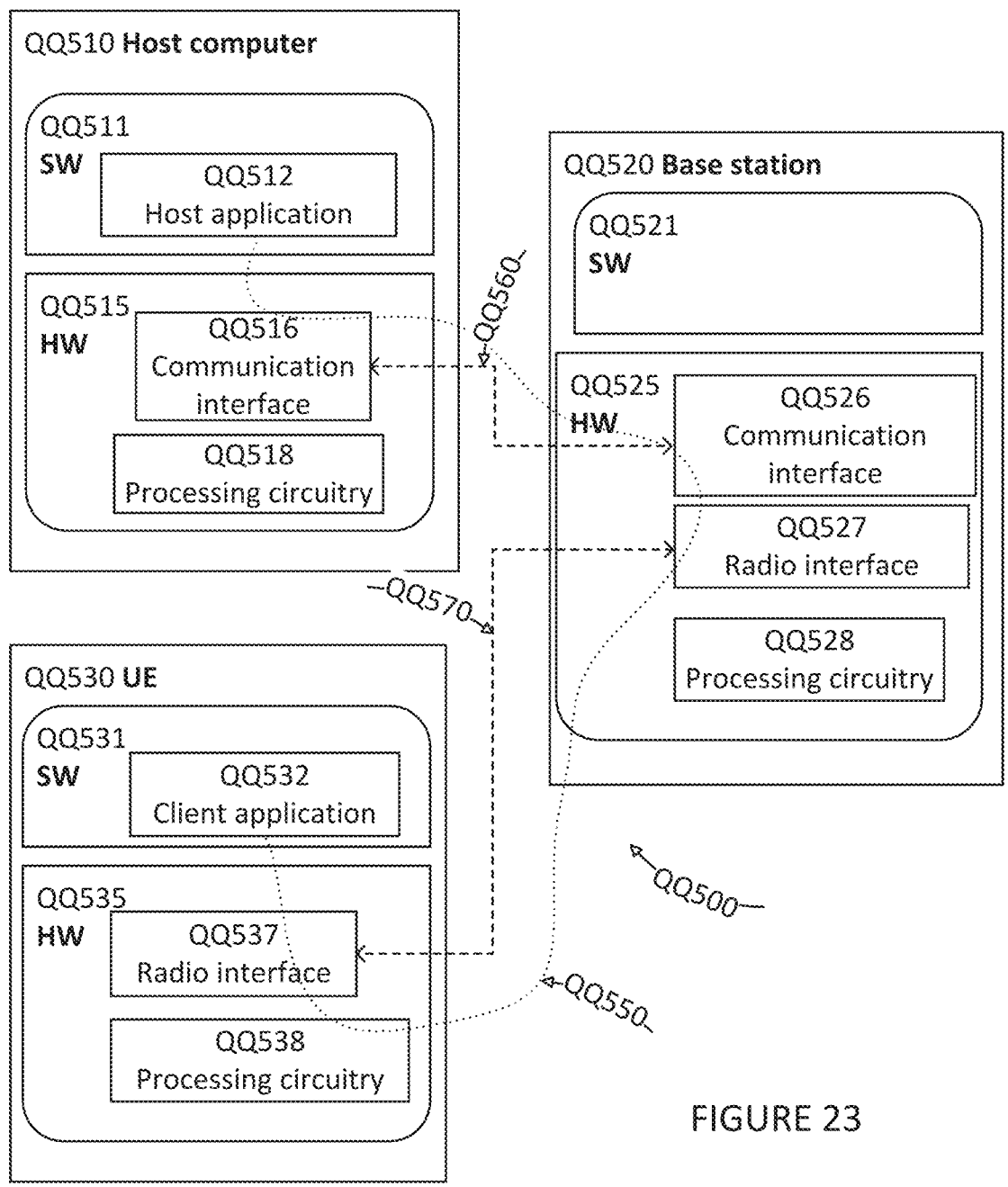
FIG. 23 is a block diagram of a host computer communicating via a base station with a user equipment over a partially wireless connection in accordance with some embodiments.

FIG. 23: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 23) served by base station QQ520. Communication interface QQ526 may be configured to facilitate connection QQ560 to host computer QQ510. Connection QQ560 may be direct or it may pass through a core network (not shown in FIG. 23) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412a, QQ412b, QQ412c and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 24:
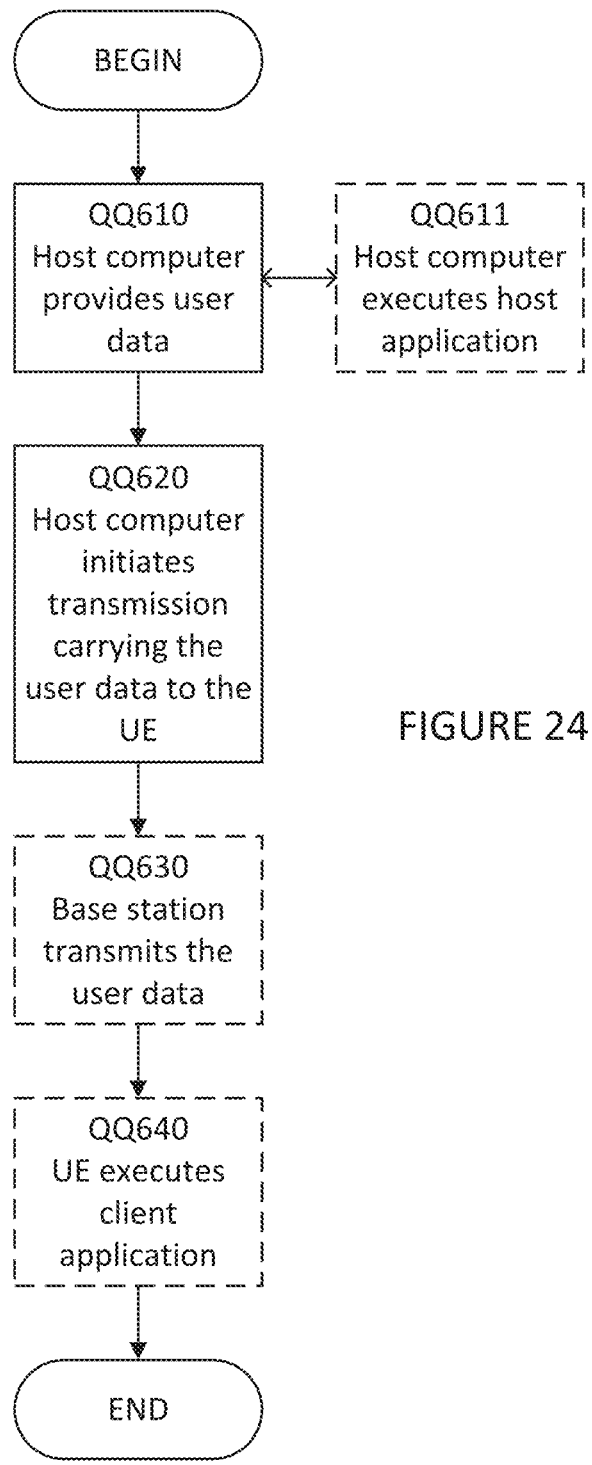
FIG. 24 is a block diagram of methods implemented in a communication system including a host computer, a base station and a user equipment in accordance with some embodiments.

FIG. 24: Methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 25:
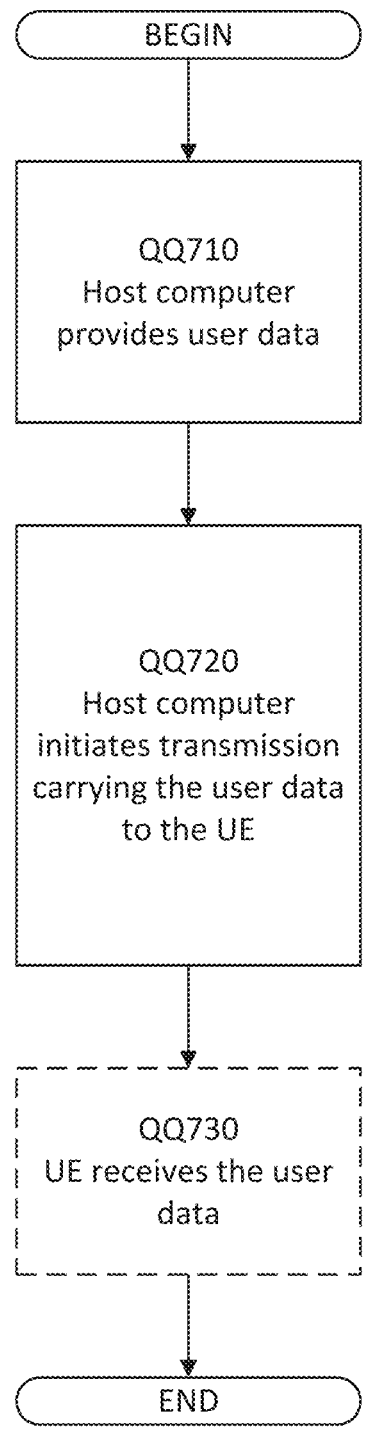
FIG. 25 is a block diagram of methods implemented in a communication system including a host computer, a base station and a user equipment in accordance with some embodiments.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 26:
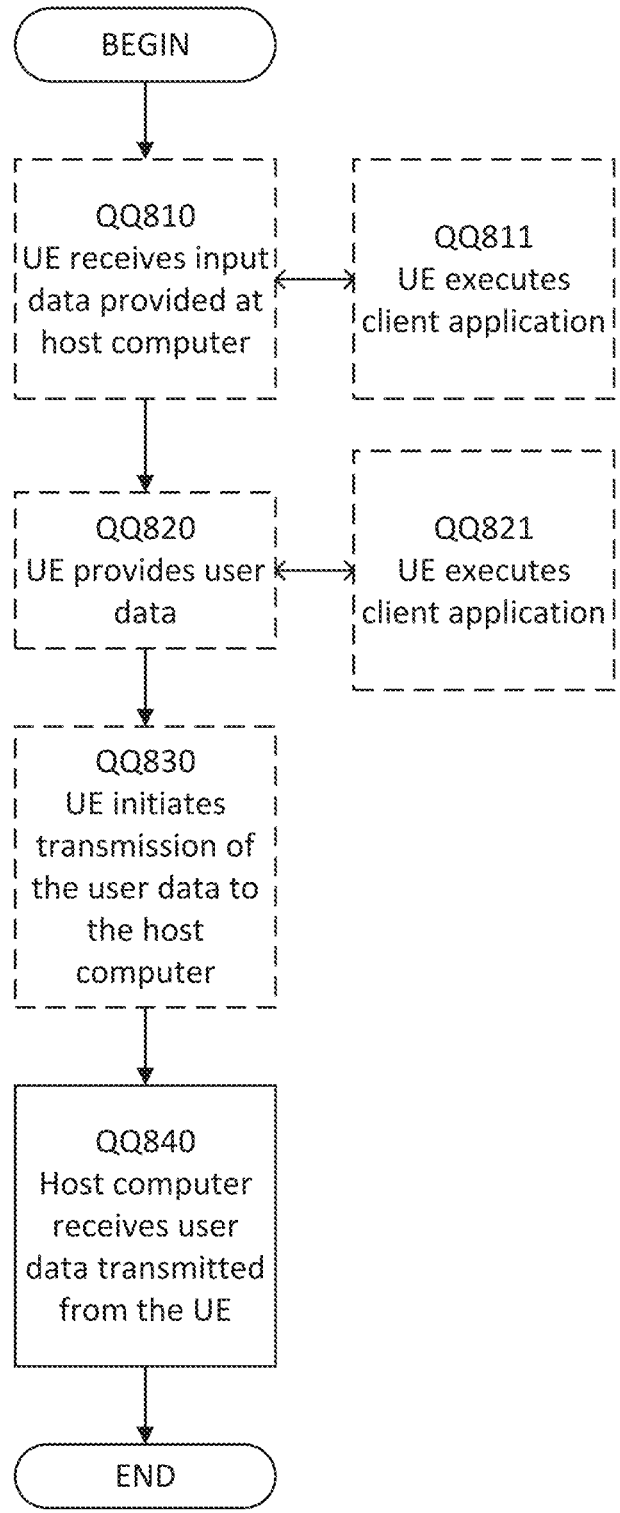
FIG. 26 is a block diagram of methods implemented in a communication system including a host computer, a base station and a user equipment in accordance with some embodiments.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 27:
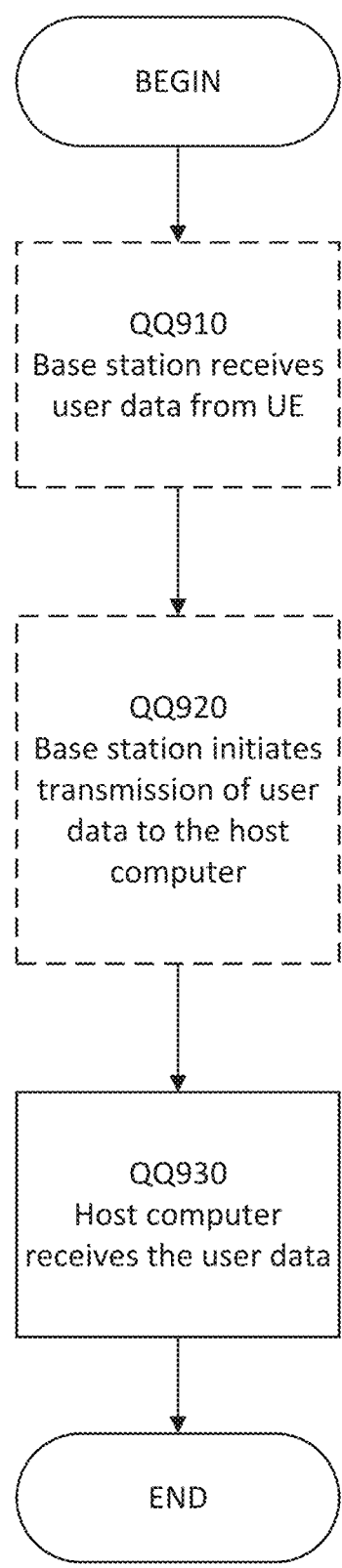
FIG. 27 is a block diagram of methods implemented in a communication system including a host computer, a base station and a user equipment in accordance with some embodiments.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a master radio access network, RAN, node in a wireless communication network, the method comprising:
 transmitting, to a secondary RAN node, a secondary RAN node addition or modification request message to request preparation or modification of resources for dual connectivity communication for a wireless terminal, and
 receiving a response from the secondary RAN node, responsive to the addition or modification request message,
 wherein resource coordination information is included as an information element (IE) of the secondary RAN node addition or modification request message and defines at least one sidelink communication resource for a wireless terminal served by the master RAN node;
wherein the resource coordination information includes a bitmap defining the at least one sidelink communication resource that is available for the wireless terminal to use for sidelink communication;
wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

2. The method according to claim 1, wherein the resource coordination information further includes an indication of a frequency resource associated with the bitmap.

3. The method according to claim 1, wherein transmitting comprises transmitting the resource coordination information with a cell identifier of the master RAN node.

4. The method according to claim 1, wherein the sidelink communication comprises a vehicle-to-anything, V2X, communication, and wherein transmitting comprises transmitting the resource coordination information with V2X authorization information.

5. The method according to claim 4, wherein the V2X authorization information indicates that the wireless terminal is authorized to provide V2X communication as a pedestrian and/or as a vehicle.

6. The method according to claim 1, wherein transmitting comprises transmitting the resource coordination information with an indication of a priority associated with sidelink communications for the wireless terminal using the at least one communication resource.

7. The method according to claim 6, wherein the priority is based on a quality of service, QoS, requirement of the sidelink communications for the wireless terminal using the at least one communication resource.

8. The method according to claim 1, wherein transmitting comprises transmitting the resource coordination information with spatial division multiplexing information associated with the wireless terminal.

9. The method according to claim 1, wherein the resource coordination information is first resource coordination information, the method further comprising:
receiving second resource coordination information from the secondary RAN node, wherein the second resource coordination information is responsive to the first resource coordination information.

10. The method according to claim 9, wherein the second resource coordination information includes an acknowledgement of the first resource coordination information.

11. A method of operating a secondary radio access network, RAN, node in a wireless communication network, the method comprising:
receiving, from a master RAN node, a secondary RAN node addition or modification request message to request preparation or modification of resources for dual connectivity communication for a wireless terminal, and transmitting a response to the master RAN node, responsive to the addition or modification request message,
wherein resource coordination information is included as an information element (IE) of the secondary RAN node addition or modification request message and defines at least one sidelink communication resource for a wireless terminal served by the master RAN node,
wherein the resource coordination information includes a bitmap defining the at least one sidelink communication resource that is available for the wireless terminal to use for sidelink communication;
wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

12. A master radio access network, RAN, node for a wireless communication network, the node comprising:
a processor; and
memory coupled with the processor, wherein the memory includes instructions that when executed by the processor causes the master RAN node to,
transmit from the master RAN node to a secondary RAN node a secondary RAN node addition or modification request message to request preparation or modification of resources for dual connectivity communication for a wireless terminal, and
receive a response from the secondary RAN node, responsive to the addition or modification request message,
wherein resource coordination information is included as an information element of the secondary RAN node addition or modification request message and defines at least one sidelink communication resource for a wireless terminal served by the master RAN node;
wherein the resource coordination information includes a bitmap defining the at least one sidelink communication resource that is available for the wireless terminal to use for sidelink communication;
wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

13. A secondary radio access network, RAN, node for a wireless communication network, the node comprising:
a processor; and
memory coupled with the processor, wherein the memory includes instructions that when executed by the processor causes the secondary RAN node to,
receive, from a master RAN node, a secondary RAN node addition or modification request message to request preparation or modification of resources for dual connectivity communication for a wireless terminal, and
transmit a response to the master RAN node, responsive to the addition or modification request message,
wherein resource coordination information is included as an information element of the secondary RAN node addition or modification request message and defines at least one sidelink communication resource for a wireless terminal served by the master RAN node;
wherein the resource coordination information includes a bitmap defining the at least one sidelink communication resource that is available for the wireless terminal to use for sidelink communication;

wherein each bit of the bitmap corresponds to a time resource, wherein a first value of a bit of the bitmap indicates that the respective time resource is available for the wireless terminal to use for sidelink communication, and wherein a second value of a bit of the bitmap indicates that the respective time resource is not available for the wireless terminal to use for sidelink communication.

* * * * *